(12) United States Patent
Fukaya

(10) Patent No.: US 12,147,127 B2
(45) Date of Patent: Nov. 19, 2024

(54) LIQUID CRYSTAL DISPLAY

(71) Applicant: Sharp Display Technology Corporation, Kameyama (JP)

(72) Inventor: Tetsuo Fukaya, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/407,595

(22) Filed: Jan. 9, 2024

(65) Prior Publication Data

US 2024/0255815 A1    Aug. 1, 2024

(30) Foreign Application Priority Data

Jan. 31, 2023  (JP) ................. 2023-012982

(51) Int. Cl.
| | |
|---|---|
| *G02F 1/1345* | (2006.01) |
| *G02F 1/1343* | (2006.01) |
| *G02F 1/1362* | (2006.01) |
| *G02F 1/1368* | (2006.01) |

(52) U.S. Cl.
CPC .. *G02F 1/134372* (2021.01); *G02F 1/136286* (2013.01); *G02F 1/1368* (2013.01)

(58) Field of Classification Search
CPC .................................................. G02F 1/1345
See application file for complete search history.

(56) References Cited

U.S. PATENT DOCUMENTS

| | | |
|---|---|---|
| 8,643,799 B2 | 2/2014 | Choi |
| 2005/0030461 A1 | 2/2005 | Ono et al. |
| 2005/0078260 A1 | 4/2005 | Ono et al. |
| 2005/0078261 A1 | 4/2005 | Ono et al. |
| 2005/0078262 A1 | 4/2005 | Ono et al. |
| 2005/0083470 A1 | 4/2005 | Ono et al. |
| 2005/0083471 A1 | 4/2005 | Ono et al. |
| 2008/0013028 A1 | 1/2008 | Ono et al. |
| 2008/0062371 A1 | 3/2008 | Ono et al. |
| 2009/0091697 A1 | 4/2009 | Ono et al. |
| 2009/0096974 A1 | 4/2009 | Ono et al. |
| 2009/0096979 A1 | 4/2009 | Ono et al. |
| 2009/0128764 A1 | 5/2009 | Ono et al. |
| 2009/0135326 A1 | 5/2009 | Ono et al. |

(Continued)

FOREIGN PATENT DOCUMENTS

| | | |
|---|---|---|
| JP | 2011-048394 A | 3/2011 |
| WO | 2015/087585 A1 | 6/2015 |

*Primary Examiner* — Sang V Nguyen
(74) *Attorney, Agent, or Firm* — ScienBiziP, P.C.

(57) ABSTRACT

There is provided a liquid crystal display in a fringe field switching mode including a first pixel and a second pixel which are contiguous to each other, in which a first substrate, a liquid crystal layer, and a second substrate are sequentially provided, the first substrate has at least one layer of a lower layer member, a first pixel electrode and a second pixel electrode, an interlayer insulating film, and a common electrode, in order toward a liquid crystal layer side, at least one layer of the lower layer member has a first region and a second region having a smaller thickness than that of the first region via a step difference portion, and the first pixel electrode and the second pixel electrode are disposed in the first region, and the second region is disposed between the first pixel electrode and the second pixel electrode.

19 Claims, 22 Drawing Sheets

(56) References Cited

U.S. PATENT DOCUMENTS

| | | | |
|---|---|---|---|
| 2009/0207362 A1* | 8/2009 | Nagano | G02F 1/134363 |
| | | | 349/139 |
| 2010/0296042 A1* | 11/2010 | Yonemura | G02F 1/133512 |
| | | | 349/143 |
| 2010/0328596 A1 | 12/2010 | Ono et al. | |
| 2011/0199552 A1 | 8/2011 | Ono et al. | |
| 2011/0199553 A1 | 8/2011 | Ono et al. | |
| 2012/0002150 A1 | 1/2012 | Ono et al. | |
| 2012/0002151 A1 | 1/2012 | Ono et al. | |
| 2012/0133865 A1* | 5/2012 | Yonemura | G02F 1/133528 |
| | | | 349/110 |
| 2012/0268683 A1 | 10/2012 | Ono et al. | |
| 2012/0281160 A1 | 11/2012 | Ono et al. | |
| 2013/0201419 A1 | 8/2013 | Ono et al. | |
| 2013/0208203 A1 | 8/2013 | Ono et al. | |
| 2014/0043556 A1 | 2/2014 | Ono et al. | |
| 2014/0300851 A1 | 10/2014 | Ono et al. | |
| 2015/0177580 A1 | 6/2015 | Ono et al. | |
| 2016/0211478 A1* | 7/2016 | Nirengi | H10K 59/12 |
| 2016/0238909 A1 | 8/2016 | Ono et al. | |
| 2016/0238910 A1 | 8/2016 | Ono et al. | |
| 2016/0370664 A1* | 12/2016 | Fukaya | G02F 1/133345 |
| 2019/0056629 A1 | 2/2019 | Ono et al. | |
| 2023/0168531 A1* | 6/2023 | Li | G02F 1/136286 |
| | | | 349/42 |

* cited by examiner

FIG. 11
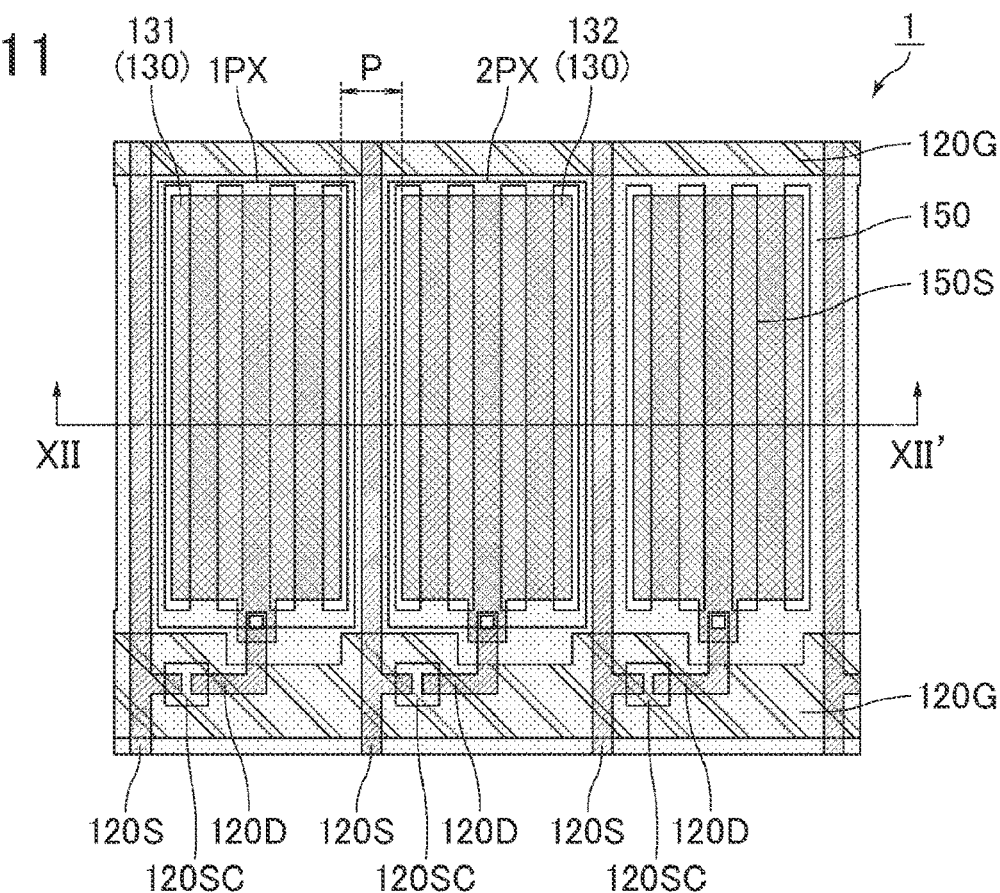
FIG. 12    OBSERVATION SURFACE SIDE
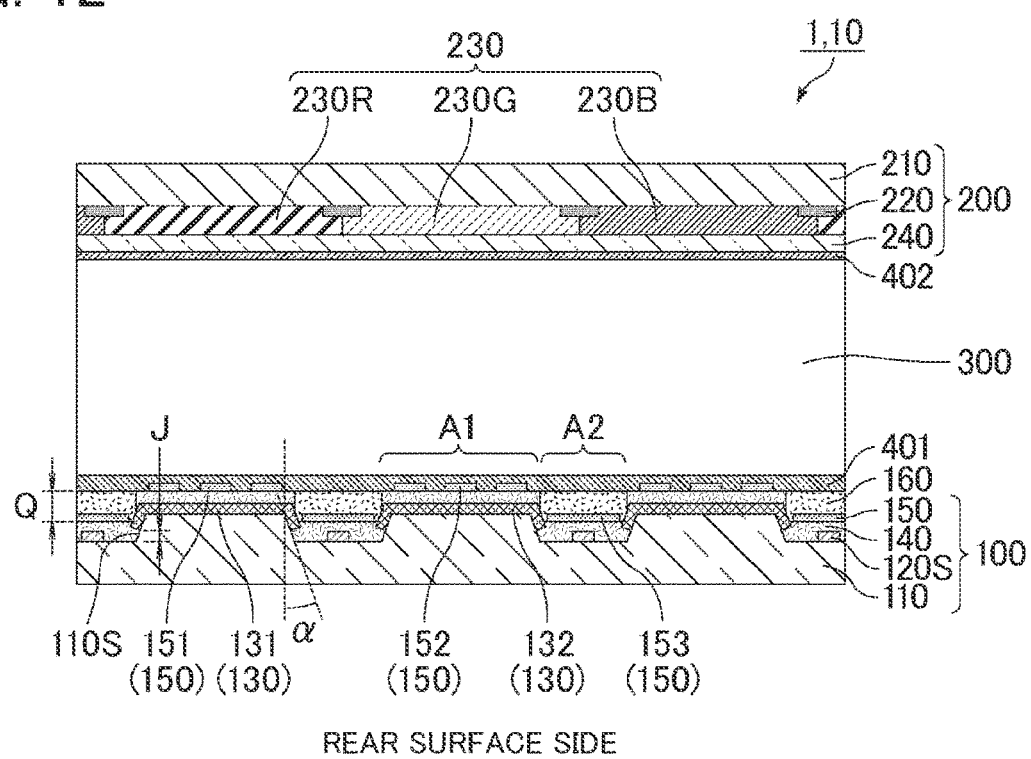
REAR SURFACE SIDE

LIQUID CRYSTAL DISPLAY

BACKGROUND

1. Field

The following disclosure relates to a liquid crystal display.

2. Description of the Related Art

A liquid crystal display is a display device that uses a liquid crystal composition for display, and a typical display method thereof is to apply a voltage to a liquid crystal composition sealed between a pair of substrates, and change an alignment state of the liquid crystal molecules in the liquid crystal composition according to the applied voltage to control the amount of light transmitted. Such a liquid crystal display is used in a wide field by utilizing characteristics such as thinness, lightness, and low power consumption.

As a display method of a liquid crystal display, a horizontal alignment mode in which the alignment of liquid crystal molecules is controlled by mainly rotating the liquid crystal molecules within a plane parallel to a substrate surface, is attracting attention due to the reason that wide viewing angle characteristics can be easily obtained. In particular, in recent years, a fringe field switching (FFS) mode in which liquid crystal molecules having a positive or negative anisotropy of dielectric constant are aligned in a direction horizontal to a main surface of a substrate is often used. Liquid crystal displays in the FFS mode have been proposed, for example, in Japanese Unexamined Patent Application Publication No. 2011-048394, International Publication No. 2015/087585, and U.S. Pat. No. 8,643,799.

The liquid crystal display in the FFS mode has two types of modes in which the arrangement of a common electrode and a pixel electrode is different. A first mode is a V2 mode (also referred to as FFS/V2 mode) including a planar common electrode, an insulating film disposed on the common electrode, and a plurality of pixel electrodes disposed on the insulating film corresponding to each of a plurality of pixels and provided with slits. More specifically, as illustrated in FIG. 42, one substrate of a pair of substrates sandwiching the liquid crystal layer includes a planar common electrode 150R, an insulating film 141R, and a plurality of pixel electrodes 130R provided with slits. Usually, an organic insulating film 142R is disposed between the common electrode 150R and a source wiring 120S (and the source electrode), and a gate insulating film 112R is disposed between the source wiring 120S (and the source electrode) and the gate wiring (and the gate electrode) (not illustrated) (refer to FIG. 42). FIG. 42 is a schematic cross-sectional view illustrating a configuration of one substrate of a pair of substrates in an example of a liquid crystal display in the FFS/V2 mode.

A second mode is a V3 mode (also referred to as FFS/V3 mode) including a plurality of planar pixel electrodes disposed corresponding to each of the plurality of pixels, an insulating film disposed on the plurality of pixel electrodes, and a common electrode disposed on the insulating film and provided with a slit. More specifically, as illustrated in FIG. 43, one substrate of a pair of substrates sandwiching the liquid crystal layer includes a plurality of planar pixel electrodes 130R, an insulating film 140R, and a common electrode 150R provided with a slit. Usually, the source wiring 120S (and the source electrode) is disposed between the plurality of pixel electrodes 130R, and the gate insulating film 112R is disposed between the source wiring 120S (and the source electrode) and the gate wiring (and the gate electrode) (not illustrated) (refer to FIG. 43). FIG. 43 is a schematic cross-sectional view illustrating a configuration of one substrate of a pair of substrates in an example of a liquid crystal display in the FFS/V3 mode.

Japanese Unexamined Patent Application Publication No. 2011-048394, International Publication No. 2015/087585, and U.S. Pat. No. 8,643,799 disclose a liquid crystal display in the FFS/V3 mode. In the FFS/V3 mode, even when the same liquid crystal molecules as in the FFS/V2 mode are used, there is a problem that the transmittance is lower than that in the FFS/V2 mode. Therefore, International Publication No. 2015/087585 proposes a method for improving transmittance when a voltage is applied by disposing a step difference portion protruding to a liquid crystal layer side in a region between pixel electrodes disposed in contiguous pixels, and by covering at least the side surface of the step difference portion with the common electrode, and this method has been significantly useful in the field of liquid crystal displays.

However, even in the liquid crystal display in the related art, there is still room for improvement to further improve the transmittance when a voltage is applied to further realize higher definition of a display image. Further, there is room for improvement to be applicable to a case where high contrast (CR) is demanded instead of high transmittance or together with high transmittance.

It is desirable to provide a liquid crystal display in an FFS/V3 mode capable of improving transmittance and/or contrast when a voltage is applied.

SUMMARY

According to an aspect of the present disclosure, there is provided a liquid crystal display in a fringe field switching mode including a first pixel and a second pixel which are contiguous to each other, in which a first substrate, a liquid crystal layer, and a second substrate are sequentially provided, the first substrate has at least one layer of a lower layer member, a first pixel electrode and a second pixel electrode which are disposed corresponding to each of the first pixel and the second pixel, an interlayer insulating film, and a common electrode provided with a plurality of parallel slits, in order toward a liquid crystal layer side, at least one layer of the lower layer member has a first region and a second region having a smaller thickness than that of the first region via a step difference portion, and the first pixel electrode and the second pixel electrode are disposed in the first region, and the second region is disposed between the first pixel electrode and the second pixel electrode.

BRIEF DESCRIPTION OF THE DRAWINGS

FIG. 11 is a schematic plan view of a liquid crystal display according to Embodiment 3;

FIG. 12 is a schematic cross-sectional view (sectional view taken along the line XII-XII') taken along the line XII-XII' of FIG. 11 as a cut surface;

DESCRIPTION OF THE EMBODIMENTS

Definition of Term

In the present specification, the observation surface side means a side closer to a screen (display surface) of a liquid crystal display, and the rear surface side means a side farther from the screen (display surface) of the liquid crystal display.

The visible light means light (electromagnetic waves) having a wavelength of 380 nm or more and less than 800 nm.

The pixel is the minimum unit constituting a display image, and the pixel is a region including a plurality of pixels having colors different from each other.

A liquid crystal display according to an embodiment of the present disclosure will be described. The present disclosure is not limited to the following embodiments, and design changes can be made as appropriate within the scope of satisfying a configuration of the present disclosure.

Embodiment 1

Figure 1:
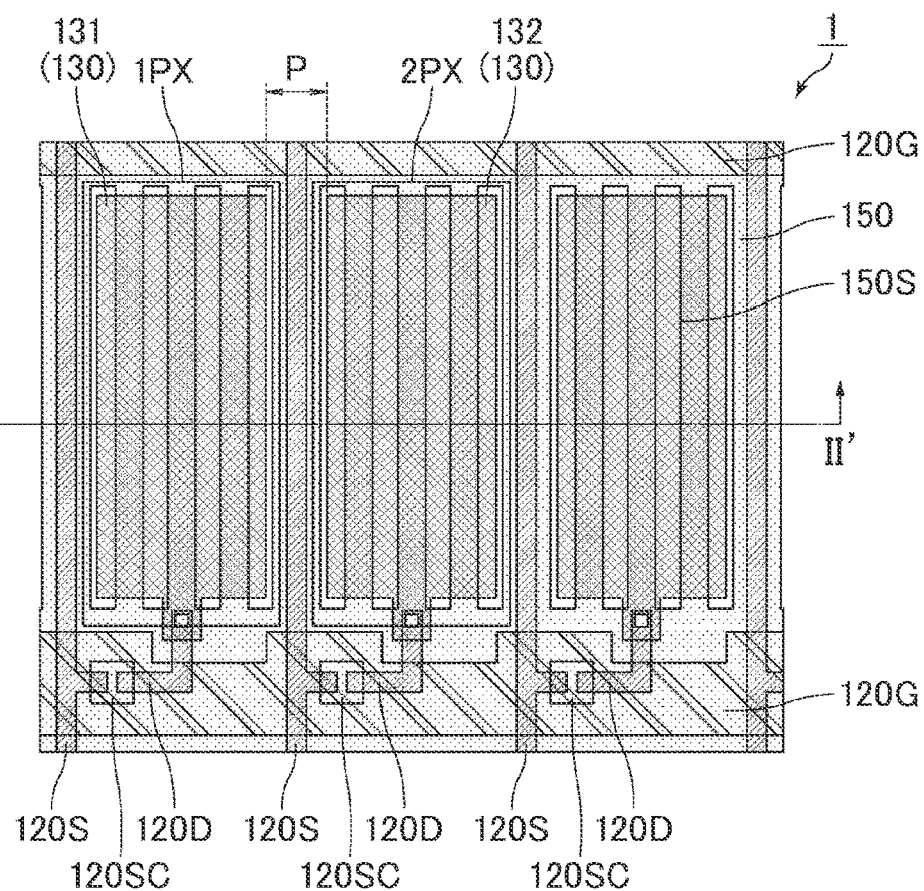
FIG. 1 is a schematic plan view of a liquid crystal display according to Embodiment 1.
Figure 2:
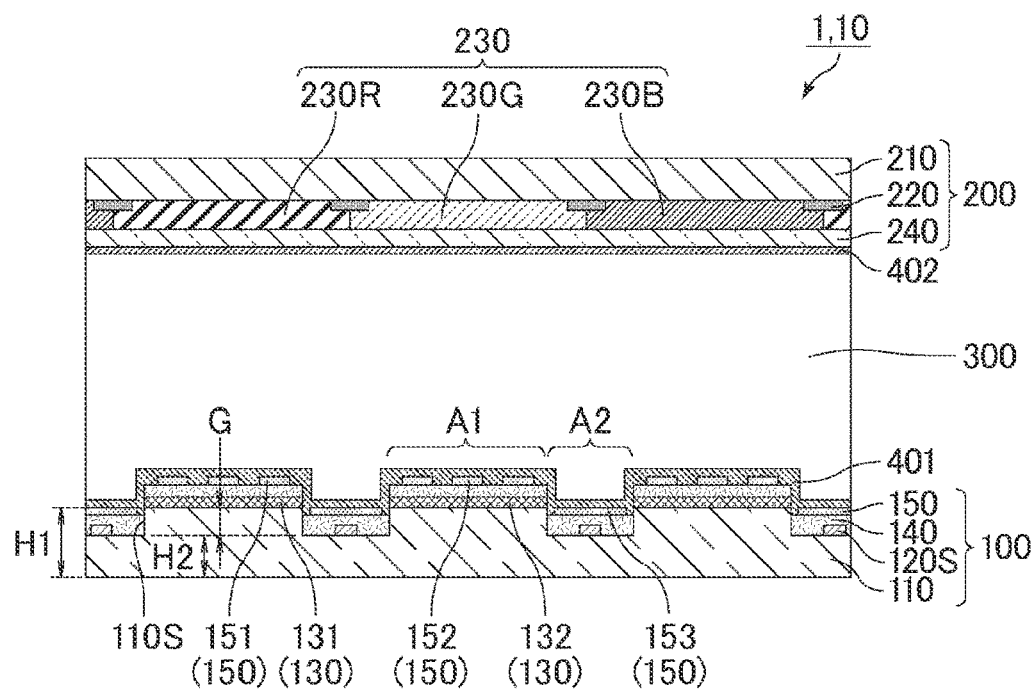
FIG. 2 is a schematic cross-sectional view (sectional view taken along the line II-II') taken along the line II-II' of FIG. 1 as a cut surface.
Figure 3:
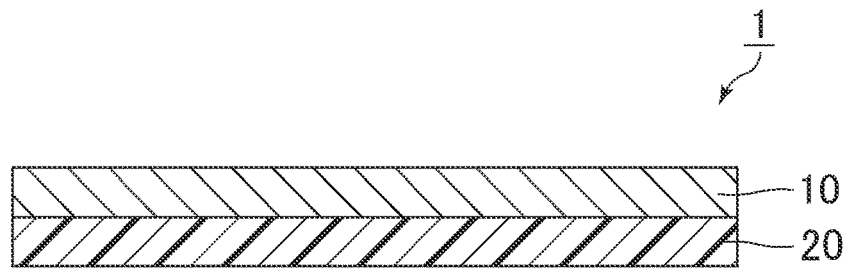
FIG. 3 is a schematic cross-sectional view of a liquid crystal display including a backlight on a rear surface side.

FIG. 1 is a schematic plan view of a liquid crystal display according to the present embodiment. FIG. 2 is a schematic cross-sectional view (sectional view taken along the line II-II') taken along the line II-II' of FIG. 1 as a cut surface. As illustrated in FIGS. 1 and 2, a liquid crystal display 1 of the present embodiment includes a first pixel 1PX and a second pixel 2PX contiguous to each other, and includes a first substrate 100, a liquid crystal layer 300, and a second substrate 200 in order from the rear surface side toward the observation surface side. More specifically, the liquid crystal display 1 of the present embodiment further includes a backlight 20 on the rear surface side (refer to FIG. 3). That is, it can be said that the liquid crystal display 1 includes the first pixel 1PX and the second pixel 2PX contiguous to each other, and includes a liquid crystal panel 10 having the first substrate 100, the liquid crystal layer 300, and the second substrate 200, and the backlight 20 disposed on the rear surface side of the liquid crystal panel 10 in order from the rear surface side toward the observation surface side. Therefore, FIG. 1 is also a schematic plan view of the liquid crystal panel 10 included in the liquid crystal display 1. FIG. 3 is a schematic cross-sectional view of an aspect including the backlight on the rear surface side. The liquid crystal display 1 (and the liquid crystal panel 10) further includes a first alignment film 401 between the first substrate 100 and the liquid crystal layer 300, and includes a second alignment film 402 between the second substrate 200 and the liquid crystal layer 300 (refer to FIG. 2). The first alignment film 401 and the second alignment film 402 may be collectively referred to as an alignment film 400.

The first substrate 100 includes a lower layer member 110, a first pixel electrode 131 and a second pixel electrode 132 which are disposed corresponding to each of the first pixel 1PX and the second pixel 2PX, an interlayer insulating film 140, and a common electrode 150 in order toward the liquid crystal layer 300 side. The common electrode 150 is provided with a plurality of parallel slits 150S. The first pixel electrode 131 and the second pixel electrode 132 may be collectively referred to as the pixel electrode 130. Although one pixel unit is illustrated in FIGS. 1, 2, and the like, such a configuration is repeatedly arranged in the left-right direction of the drawings. The same applies to other drawings.

The lower layer member 110 includes a step difference portion 110S between a first region A1 having a thickness H1 and a second region A2 having a thickness H2 (here, H1>H2). The step difference portion 110S is provided perpendicularly to the bottom surface of the lower layer member 110 in a cross-sectional view. Here, "the step difference portion is provided perpendicularly to the bottom surface of the lower layer member in a cross-sectional view" means that the step difference portion forms an angle of 85° or more and 90° or less with respect to the bottom surface of the lower layer member in a cross-sectional view. In other words, this means that an angle α (also referred to as a taper angle of the step difference portion 110S) made by the normal direction of the bottom surface of the lower layer member and the step difference portion 110S is 0° or more and 5° or less.

A thickness difference G (that is, H1–H2) between the first region A1 and the second region A2 is preferably 100 nm or more. The difference G is more preferably 150 nm or more, even more preferably 200 nm or more, and particularly preferably 300 nm or more. In a case where the source wiring 120S is disposed in the second region A2, G is preferably larger than the film thickness of the source wiring 120S. As a result, the transmittance when a voltage is applied is further improved. On the other hand, from the viewpoint of further increasing the contrast of the liquid crystal display, G is preferably 1,000 nm or less. G is more preferably 800 nm or less, and even more preferably 600 nm or less. The thickness difference G is a value obtained by subtracting the thickness H2 of the lower layer member 110 (that is, the second region A2) in an inter-pixel space P from the thickness H1 of the lower layer member 110 immediately below the pixel electrode 130 (refer to FIG. 2).

As described later, the liquid crystal display 1 (and the liquid crystal panel 10) of the present embodiment has a structure in which the surface of the pixel electrode 130 protrudes to the liquid crystal layer 300 side from the surface on the liquid crystal layer 300 side of the common electrode (third common electrode 153) overlapping the second region A2, and the thickness H1 of the first region A1 is adjusted to have this structure. For example, H1 is preferably 500 nm or more. More preferably, H1 is 550 nm or more. In addition, H1 is preferably 2,000 nm or less. More preferably, H1 is 1,800 nm or less.

The thickness H2 of the second region A2 is, for example, preferably 100 nm or more and 1,900 nm or less (however, less than H1). More preferably, H2 is 150 nm or more and 1,650 nm or less.

In the present embodiment, the pixel electrode 130 is disposed in the first region A1, the pixel electrode 130 is not disposed in the second region A2, and the space between the first pixel electrode 131 and the second pixel electrode 132 (P in FIG. 1) is defined as the second region A2. According to this aspect, a structure in which the pixel electrode 130 protrudes to the liquid crystal layer 300 side is employed. The common electrode overlapping the first pixel electrode 131 is also referred to as a first common electrode 151, the common electrode overlapping the second pixel electrode 132 is also referred to as a second common electrode 152, and the common electrode overlapping with the second region A2 is referred to as a third common electrode 153. In the present embodiment, a structure in which, in particular, by increasing the thickness of the first region A1, in a cross-sectional view, the surface of the pixel electrode 130 protrudes to the liquid crystal layer 300 side from the surface on liquid crystal layer 300 side of the third common electrode 153 is employed (refer to FIG. 2). That is, in the present embodiment, although the liquid crystal display is the liquid crystal display in the FFS/V3 mode, in the relationship between the third common electrode 153 and the pixel electrode 130, an electrode structure of a configuration (Pix/COM) having a pixel electrode and a common electrode in order from the observation surface side is realized. This is an electrode structure that was not realized in the FFS/V3 mode in the related art.

Figure 4:
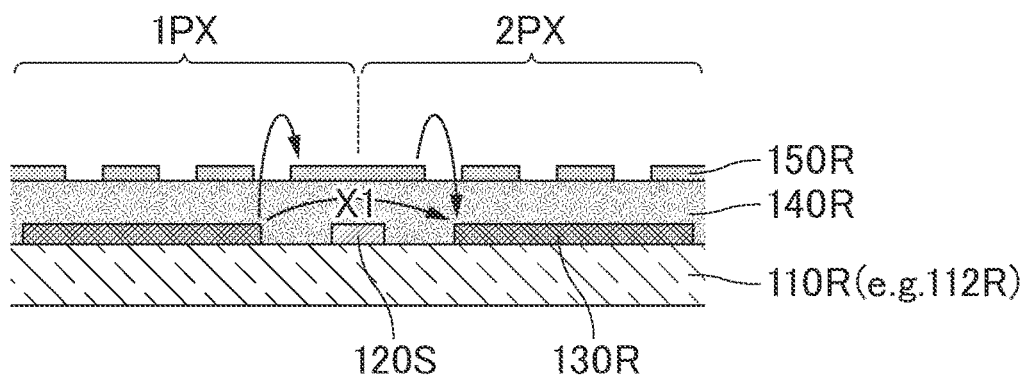
FIG. 4 is a view in which an electric field generated in the liquid crystal display in an FFS/V3 mode of the related art is examined.

In the liquid crystal display in the FFS/V3 mode in the related art (for example, devices described in Japanese Unexamined Patent Application Publication No. 2011-048394, International Publication No. 2015/087585, and U.S. Pat. No. 8,643,799), the electrode structure adopts a configuration (COM/Pix) having a common electrode and a pixel electrode in order from the observation surface side to the rear surface side (refer to FIGS. 4, 17, and 43). FIG. 4 (and FIG. 17) is a view in which an electric field generated in the liquid crystal display in the FFS/V3 mode of the related art is examined. When a voltage is applied to this (COM/Pix) configuration, a transverse electric field in the inter-pixel space (an electric field in a direction horizontal to the substrate) may not sufficiently reach the liquid crystal layer. More specifically, in the FFS/V3 mode in the related art, since a fringe electric field of the same polarity is applied to each pixel, the liquid crystal molecules are aligned and voltage-transmittance performance (also referred to as VT performance) occurs. On the other hand, although a transverse electric field is generated in the inter-pixel space because the polarity is different for each pixel, the transverse electric field is shielded by the common electrode, and the transverse electric field is unlikely to influence the liquid crystal layer (refer to X1 in FIG. 4). In particular, in the inter-pixel space, since the electric field influence of the source wiring 120S (and the source electrode) is received, the influence of the transverse electric field on the liquid crystal layer is reduced. As described above, the transverse electric field may not reach the inter-pixel space. In this case, since the direction of the liquid crystal molecules is not changed sufficiently, it is not possible to sufficiently improve the transmittance of the pixel edge. As high definition of a display device progresses, it is considered that such an influence of transmittance on the entire pixel unit becomes remarkable. The inter-pixel space (reference numeral P in FIG. 1) means a space between a pixel electrode and a pixel electrode contiguous to the pixel electrode (also referred to as a pixel edge).

Figure 5:
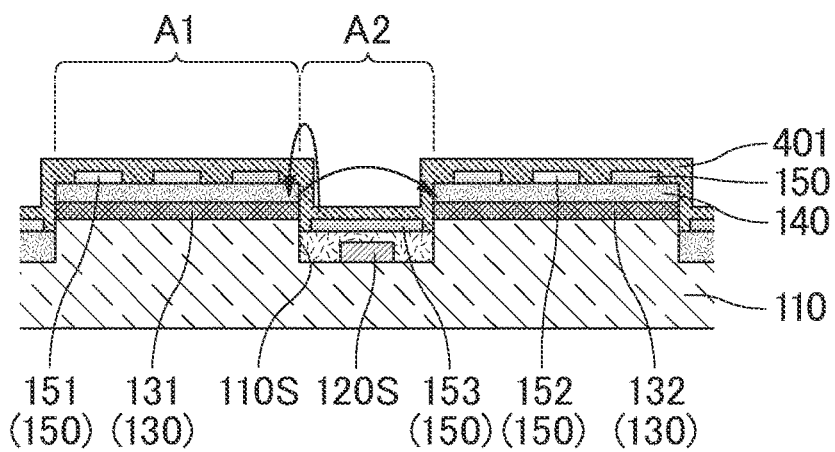
FIG. 5 is a view in which an electric field generated in the liquid crystal display according to Embodiment 1 is examined.
Figure 6A:
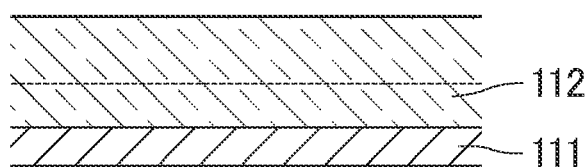
FIG. 6A is a view for describing one step of a gate insulating film formation process in a method for manufacturing the liquid crystal display according to Embodiment 1.
Figure 6B:
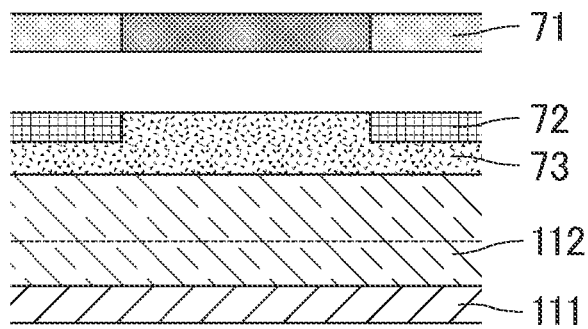
FIG. 6B is a view for describing one step of the gate insulating film formation process in the method for manufacturing the liquid crystal display according to Embodiment 1.
Figure 6C:
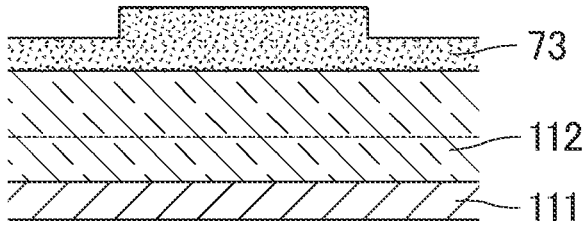
FIG. 6C is a view for describing one step of the gate insulating film formation process in the method for manufacturing the liquid crystal display according to Embodiment 1.
Figure 6D:
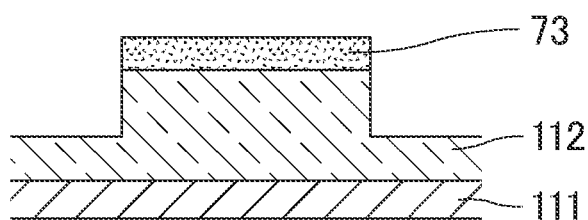
FIG. 6D is a view for describing one step of the gate insulating film formation process in the method for manufacturing the liquid crystal display according to Embodiment 1.
Figure 6E:
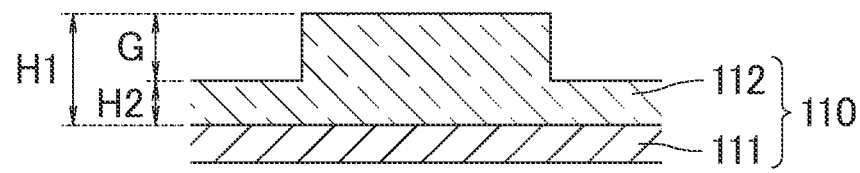
FIG. 6E is a view for describing one step of the gate insulating film formation process in the method for manufacturing the liquid crystal display according to Embodiment 1.

On the other hand, in the configuration (Pix/COM) of the present embodiment in which the disposition order of the electrodes is reversed, the pixel electrode 130 is at a position protruding to the liquid crystal layer 300 side from the third common electrode 153, and accordingly, the transverse electric field generated in the inter-pixel space can sufficiently reach the liquid crystal layer (refer to FIG. 5). FIG. 5 is a view in which an electric field generated in the liquid crystal display according to the present embodiment is examined. As a result, the liquid crystal molecules of the liquid crystal layer overlapping the pixel edge can be easily aligned, and the transmittance of this part is improved. The liquid crystal display according to the present embodiment is also useful from the viewpoint of productivity.

The lower layer member 110 is formed of one or more layers, and the thickness difference G is provided in one or more of the layers, and the first region A1 where the pixel electrode 130 is disposed and the second region A2 where the pixel electrode 130 is not disposed are formed (refer to FIG. 2). The lower layer member having the thickness difference G may be any layer. For example, as the lower layer member 110, a member including a first support substrate 111, a member including a first support substrate and an insulating film, or the like is employed, but in these cases, the lower layer member having the first region A1 and the second region A2 may be the first support substrate 111, may be an insulating film, or may be both the first support substrate and an insulating film. In the present embodiment, among the insulating films, a gate insulating film 112 has the thickness difference G (refer to FIG. 2). That is, the lower layer member having the first region A1 and the second region A2 is the gate insulating film 112. In other words, the lower layer member 110 of the present embodiment includes the first support substrate 111 and the gate insulating film 112, the gate insulating film 112 has the thickness difference G, and the first region A1 where the pixel electrode 130 is disposed and the second region A2 where the pixel electrode 130 is not disposed are formed.

The first support substrate 111 is preferably a transparent substrate, and examples of the first support substrate 111 include a glass substrate, a plastic substrate, and the like.

The gate insulating film 112 is preferably a film that can insulate the conductive films from each other and has a certain relative dielectric constant. Specifically, an inorganic insulating film, an organic insulating film, or a laminate of an organic insulating film and an inorganic insulating film is preferable. Examples of the inorganic insulating film include an inorganic insulating film containing SiNx, SiO2, SiNO, TiO2, or the like, or a laminated film thereof. Examples of the organic insulating film include a single layer film or a laminated film of a transparent organic polymer can be used, and examples of the organic polymers include acrylic resins, polyimide resins, or novolac resins.

The interlayer insulating film 140 is preferably a film that can insulate the conductive films from each other and has a certain relative dielectric constant. Specifically, an inorganic insulating film, an organic insulating film, or a laminate of an organic insulating film and an inorganic insulating film is preferable. Details of these are as described above. The interlayer insulating film 140 can also function as a protection film.

A relative dielectric constant ε of the inorganic insulating film is preferably, for example, 3 to 10, and the relative dielectric constant ε of the organic insulating film is preferably, for example, 2.5 to 12. As long as the relative dielectric constant is within these ranges and the conductive films can be insulated from each other, it can be suitably used as the gate insulating film 112 or the interlayer insulating film 140.

In the liquid crystal display in the related art, a silicon-based inorganic insulating film such as SiNx, SiOx, or SiNO is normally used as a gate insulating film and an interlayer insulating film. However, in the present embodiment, as described later, the dielectric constants of the gate insulating film 112 and the interlayer insulating film 140 are not particularly limited as long as the dielectric constants are within a certain range. Therefore, as the gate insulating film 112 and the interlayer insulating film 140, a silicon-based inorganic insulating film may be used, an organic insulating film may be used, a PAS film (also referred to as a passivation film) such as a SiNx film may be used, and an inorganic insulating film such as SiOx, SiNO, Al2O3, or TiO2 may be used. When an organic insulating film is used, a high aperture ratio in the liquid crystal display can be achieved. In a case of the liquid crystal display having an organic insulating film, it is more preferable to use an organic insulating film as the gate insulating film 112.

Hereinafter, a case in which a TFT substrate provided with a thin film transistor (TFT), which is a switching element used for switching on/off pixels of the liquid crystal display 1, is used as the first substrate 100, is used, will be described as an example.

The first substrate 100 includes a plurality of gate wirings 120G having the TFT and extending in parallel with each other on the first support substrate 111 in order from the rear surface side toward the observation surface side; the gate insulating film 112; the plurality of source wirings 120S extending in parallel with each other in a direction intersecting with each gate wiring 120G via the gate insulating film; the plurality of pixel electrodes 130; the interlayer insulating film 140; and the common electrode 150 (refer to FIGS. 1 and 2). The plurality of gate wirings 120G and the plurality of source wirings 120S are formed in a lattice shape as a whole to partition each pixel (1PX, 2PX, or the like). The TFT as a switching element is disposed at an intersection of each gate wiring 120G and each source wiring 120S. The gate insulating film 112 has the first region A1 having the thickness H1 and the second region A2 having the thickness H2 (refer to FIG. 2).

Each TFT is coupled to the corresponding gate wiring 120G and source wiring 120S of the plurality of gate wirings 120G and the plurality of source wirings 120S, and includes a gate electrode which protrudes from the corresponding gate wiring 120G (that is, which is a part of the gate wiring 120G), a source electrode which protrudes from the corresponding source wiring 120S (that is, which is a part of the source wiring 120S), a drain electrode 120D coupled to the corresponding pixel electrode 130 among the plurality of pixel electrodes 130, and a 3-terminal switch having a thin film semiconductor layer 120SC. The source electrode and the drain electrode are electrodes provided in the same source wiring layer as the source wiring 120S, and the gate electrode is an electrode provided in the same gate wiring layer as the gate wiring 120G. Each pixel electrode 130 is coupled to the drain electrode 120D through a contact hole provided in the gate insulating film 112, the interlayer insulating film 140, or the like.

The common electrode 150 is provided with the plurality of slits 150S parallel to each other in plan view. For example, the slit 150S is preferably provided to be inclined with respect to the initial alignment direction of the liquid crystal molecules. As a result, the liquid crystal molecules can be rotated in a certain direction, and the alignment of the liquid crystal molecules can be controlled by voltage control. The common signal kept at a constant value is supplied to the common electrode 150, and the common electrode 150 is kept at a constant potential.

Each of the pixel electrodes 130 is an electrode disposed in each region surrounded by two gate wirings 120G contiguous to each other and two source wirings 120S contiguous to each other. Each of the pixel electrodes 130 is electrically coupled to the corresponding source wiring 120S via a thin film semiconductor layer included in the TFT. Each pixel electrode 130 is set to a potential corresponding to a data signal supplied through the corresponding TFT.

The liquid crystal layer 300 contains liquid crystal molecules that are horizontally aligned with respect to the first substrate 100 when no voltage is applied, and controls the amount of light transmitted by changing alignment of the liquid crystal molecules according to the electric field generated in the liquid crystal layer 300 by the voltage applied between the common electrode 150 and the pixel electrode 130 that constitute a pair of electrodes. The liquid crystal molecules in the liquid crystal layer 300 are horizontally aligned by a regulating force of the alignment film 400 in a state where no voltage is applied between the pair of electrodes provided on the first substrate 100 (when no voltage is applied), and in a state where a voltage is applied between the pair of electrodes (when no voltage is applied), the liquid crystal molecules rotate in the in-plane direction according to the transverse electric field generated in the liquid crystal layer 300.

The liquid crystal molecule may have a positive value or may have a negative value in an anisotropy of dielectric constant ($\Delta\varepsilon$) defined by (Formula L) below. In the present embodiment, a liquid crystal molecule having a negative value for $\Delta\varepsilon$ is used. The liquid crystal molecule having the positive anisotropy of dielectric constant is also referred to as a positive liquid crystal, and the liquid crystal molecule having the negative anisotropy of dielectric constant is also referred to as a negative liquid crystal. The long-axis direction of the liquid crystal molecules is the direction of the slow axis.

$$\Delta\varepsilon = \text{(dielectric constant in ling-axis direction)} - \text{(dielectric constant in short-axis direction)} \quad \text{(Formula L)}$$

The second substrate 200 is a substrate disposed to face the first substrate 100. Hereinafter, a case where a substrate including a black matrix layer 220, a color filter layer 230, and an overcoat layer 240 on a second support substrate 210 is used as the second substrate 200 will be described as an example. The color filter layer may be disposed on the first substrate 100, but in this case, the color filter layer is not disposed on the second substrate 200. Hereinafter, a black matrix is also referred to as BM, and a color filter is also referred to as CF.

The second support substrate 210 is preferably a transparent substrate, and examples of the second support substrate 210 include a glass substrate, a plastic substrate, and the like.

The BM layer 220 is provided in a lattice shape on the second support substrate 210 to correspond to the gate wiring 120G and the source wiring 120S.

The CF layer 230 has a configuration in which a red color filter 230R, a green color filter 230G, and a blue color filter 230B are arranged in a plane and partitioned by the BM layer 220. The red color filter 230R, the green color filter 230G, and the blue color filter 230B are made of, for example, a transparent resin containing a pigment. Typically, a combination of the red color filter 230R, the green color filter 230G, and the blue color filter 230B is disposed in all pixels, and a desired color is obtained for each pixel by mixing the colors while controlling an amount of colored light transmitted through the red color filter 230R, the green color filter 230G, and the blue color filter 230B. The thicknesses of the red color filter 230R, the green color filter 230G, and the blue color filter 230B may not be the same. That is, the surface of the CF layer 230 on the liquid crystal layer 300 side may not be flat.

The overcoat layer 240 is a layer that covers the surface of the CF layer 230 on the liquid crystal layer 300 side. The overcoat layer 240 has a function of flattening the base of the alignment film 400 on the second substrate 200 side in a case where the surface of the CF layer 230 on the liquid crystal layer 300 side is not flat. It is also possible to suppress elution of the impurities in the CF layer 230 to the liquid crystal layer 300 side by the overcoat layer 240. The overcoat layer can also be referred to as a flattening layer (also referred to as a flattening film) or a protection layer (also referred to as a protection film).

As a material of the overcoat layer 240, a photocurable type or a thermosetting transparent resin is preferably used. The photocurable transparent resin is used together with, for example, a photopolymerization starter, an additive, a solvent, and the like. As the overcoat layer 240, for example, an organic film (relative dielectric constant ε=2.5 to 5) can be used.

The thickness of the overcoat layer 240 is, for example, 0.5 to 4.0 µm, and preferably 0.8 to 2.5 µm. More preferably, the thickness is 1.0 to 2.5 µm.

The alignment films 401 and 402 are disposed on the liquid crystal layer 300 side of the first substrate 100 and the liquid crystal layer 300 side of the second substrate 200, respectively (refer to FIG. 2). These alignment films 400 have a function of controlling the alignment of the liquid crystal molecules contained in the liquid crystal layer 300. Specifically, when the voltage applied to the liquid crystal layer 300 is less than the threshold voltage (including the case where no voltage is applied), the long axes of the liquid crystal molecules in the liquid crystal layer 300 are controlled to be oriented in the horizontal direction with respect to the alignment film 400 mainly by the action of the alignment film 400.

Here, "the long axes of the liquid crystal molecules in the liquid crystal layer are oriented in the horizontal direction with respect to the alignment film" means that the tilt angle (including the pretilt angle) of the liquid crystal molecules is 0 to 5° with respect to the alignment film 400. The tilt angle is preferably 0 to 3°, and more preferably 0 to 1°. The tilt angle of the liquid crystal molecule means an angle at which the long axis (optical axis) of the liquid crystal molecule is inclined with respect to the surface of the alignment film 400.

The alignment film 400 is a layer subjected to an alignment treatment for controlling the alignment of the liquid crystal molecules, and a common alignment film can be used in the field of liquid crystal displays. Examples of the material of the alignment film 400 include polymers having a main chain such as polyimide, polyamic acid, and polysiloxane, and an optical alignment film material having a photoreaction site (functional group) in the main chain or a side chain is preferably used.

The liquid crystal display 1 (and the liquid crystal panel 10) may include a pair of polarizing plates on a side opposite to the liquid crystal layer 300 on the first substrate (corresponding to the rear surface side of the first substrate 100 in FIG. 2) and a side opposite to the liquid crystal layer 300 on the second substrate (corresponding to the observation surface side of the second substrate 200 in FIG. 2) (not illustrated). The polarizing plate may be a linear polarizing plate or a circular polarizing plate.

As the polarizing plate, for example, a polarizer (absorption type polarizing plate) or the like in which an anisotropic material such as an iodine complex (or dye) on a polyvinyl alcohol (PVA) film is dyed and adsorbed, and then stretched and aligned can be used. Usually, in order to ensure mechanical strength and moisture and heat resistance, a protection film such as a triacetyl cellulose (TAC) film is laminated on both sides of the PVA film for practical use. Further, a reflective polarizing plate can be used.

The transmission axes of the pair of polarizing plates are preferably orthogonal to each other. In other words, the pair of polarizing plates is preferably disposed in a crossed Nicol state. In this case, it is possible to realize a good black display state when no voltage is applied.

In the present specification, the case where two axes (directions) are orthogonal to each other means an angle (absolute value) formed by the two axes is within a range of 90±3°, preferably within a range of 90±1°, more preferably within the range of 90±0.5°, and even more preferably 90° (completely orthogonal). In addition, in the present specification, the case where two axes (directions) are parallel with each other means an angle (absolute value) formed by the two axes is within a range of 0±3°, preferably within a range of 0±1°, more preferably within the range of 0±0.5°, and even more preferably 0° (completely parallel).

The liquid crystal display 1 may also include the backlight 20 (refer to FIG. 3). The backlight 20 is not particularly limited as long as the backlight 20 irradiates the liquid crystal panel 10 with light, and a direct type backlight, an edge type backlight, or any other type may be used. The backlight 20 includes, for example, a light source and a light guide plate. As the light guide plate, a light guide plate commonly used in the field of liquid crystal displays can be used. The backlight 20 can further use an optical sheet such as a diffuser plate and a prism sheet as appropriate.

The light source is not particularly limited as long as the light source emits light including visible light, and may emit light including only visible light or may emit light including both visible light and ultraviolet light. A light source that emits white light is preferably used to enable color display by the liquid crystal display 1. As the type of the light source, for example, a cold cathode fluorescent lamp (CCFL), a light emitting diode (LED), or the like is preferably used.

The liquid crystal display 1 further includes a plurality of members such as an external circuit such as a tape carrier package (TCP) and a printed circuit board (PCB); an optical film such as a viewing angle extending film and a brightness improving film; and a bezel (frame), and may be incorporated into other members depending on the member. Member other than the members already described is not particularly limited, and a member commonly used in the field of liquid crystal displays can be used, and thus the description thereof will be omitted.

The liquid crystal display 1 (and the liquid crystal panel 10) of the present embodiment satisfies the following Formulae (1-1), (1-2), and (1-3).

$$y = (a1/G') + b1 \qquad (1\text{-}1)$$

$$-0.070 \le a1 \le -0.018 \qquad (1\text{-}2)$$

$$0.75 \le b1 \le 0.91 \qquad (1\text{-}3)$$

In the formulae, y represents mode transmittance (%) when a voltage applied to the liquid crystal layer 300 is 4.4 to 6 V. More specifically, y is expressed by [(transmittance when voltage is applied (applied voltage=4.4 to 6 V) of the liquid crystal display 1 in which a pair of polarizing plates is disposed in a crossed Nicol state/transmittance when no voltage is applied (applied voltage=0 V) of the liquid crystal display 1 in which a pair of polarizing plates is disposed in a parallel Nicol state)×100]. a1 represents a coefficient. G' represents the difference G between the thickness H1 of the first region A1 and the thickness H2 of the second region A2, which is normalized by G=300 nm (when intentionally expressing this as a mathematical expression, "G'=G/300"). b1 represents the mode transmittance (%) when G' is infinite (∞). More specifically, b1 is expressed by [(transmittance of the liquid crystal display 1 (here, G' is infinite) in which a pair of polarizing plates is disposed in a crossed Nicol state when voltage is applied (applied voltage=4.4 to 6 V)/transmittance of the liquid crystal display 1 (here, G' is infinite) in which a pair of polarizing plates is disposed in a crossed Nicol state when no voltage is applied (applied voltage=0 V))×100]. Here, since G does not have to be equal to or more than the cell thickness (3.0 µm to 10 µm) in practical use, "when G' is infinite (∞)" means that G substantially corresponds to the case where G is equal to the cell thickness. In Example 1 described later, a simulation was performed when G was 3.0 µm which is the minimum value of the cell thickness, that is, G'=10 (refer to FIG. 25).

In the liquid crystal display of the present embodiment, even when the film thickness and the relative dielectric constant ε of the interlayer insulating film 140 and the relative dielectric constant ε of the gate insulating film 112 are changed, the relational expression of the above Formulae (1-1) to (1-3) can be satisfied. Therefore, the film thickness and the relative dielectric constant ε of the interlayer insulating film 140 and the relative dielectric constant ε of the gate insulating film 112 are not particularly limited.

Next, a method for manufacturing the liquid crystal display 1 according to the present embodiment will be described.

That is, for example, the liquid crystal display 1 of the present embodiment can be manufactured by injecting a liquid crystal material between the first substrate 100 and the second substrate 200 obtained as follows by a general method. After producing each of the substrates 100 and 200 as described below, and before injecting the liquid crystal material, the alignment films 400 may be formed respectively by performing a coating process of coating each substrate with an alignment film material. Examples of the coating method include an ink-jet method and a role coater method.

(I) Production of First Substrate

The first substrate 100 can be produced according to a method for producing a TFT substrate included in the liquid crystal display in the general FFS mode using a transparent electrode. That is, for example, a (i) gate formation process, a (ii) gate insulating film formation process, a (iii) semiconductor layer formation process, a (iv) source formation process, a (v) pixel electrode formation process, a (vi) interlayer insulating film/protection film formation process, and a (vii) common electrode formation process are performed in this order. In each process, film formation (deposition), patterning by a photolithography method, and etching, which are used in a general semiconductor production process, are performed.

The (i) gate formation process is a process of forming the gate wiring 120G and the gate electrode on the first support substrate 111, and may be performed by a general method. The gate wiring layer (including the gate electrode) is, for example, a single layer or a plurality of layers of a metal such as copper, titanium, aluminum, molybdenum, tungsten, or an alloy thereof. Examples of the plurality of layers include a laminated film of titanium and copper (Ti/Cu/Ti three-layer film or Ti/Cu two-layer film), but there are no particular restrictions as long as the gate electrode can be charged. In addition, a laminated film of titanium and aluminum (Ti/Al/Ti three-layer film or the like), a laminated film of molybdenum and copper (Mo/Cu), or the like are also included.

The (ii) gate insulating film formation process (also referred to as GI formation process) is a process of forming the gate insulating film 112. In this process, first, when applying the material of the gate insulating film, the thickness of the obtained film (also referred to as a deposition film) is increased (refer to FIG. 6A). That is, the deposition film in this process has a thickness larger than that of a normal deposition film by the thickness difference G. Thereafter, a positive photoresist is applied, exposure and development are performed through a halftone photomask 71 (refer to FIG. 6B), and thereafter a photoresist film 73 is patterned (refer to FIG. 6C). Next, a difference in thickness is provided by performing etching in a state where a part of the photoresist film 73 is left (refer to FIG. 6D). Thereafter, the photoresist film 73 is peeled off (refer to FIG. 6E). AS described above, the gate insulating film 112 of the present embodiment is formed. The obtained gate insulating film 112 has the thickness difference G (refer to FIG. 6E). FIGS. 6A to 6E are views for describing each step in the gate insulating film formation process.

The (iii) semiconductor layer formation process is a process of forming a thin film semiconductor, and is performed by a general method. The semiconductor layer is configured by, for example, a high resistance semiconductor layer made of amorphous silicon, polysilicon, or the like, and a low resistance semiconductor layer made of n+amorphous silicon or the like in which amorphous silicon is doped with impurities such as phosphorus. An oxide semiconductor such as IGZO can be used as the semiconductor layer. In a case where a transparent oxide semiconductor such as IGZO is used as a material of the semiconductor layer, the semiconductor layer can also be used as the pixel electrode 130. That is, the semiconductor layer becomes the pixel electrode 130. In this case, after the patterning treatment in the (iii) semiconductor layer formation process, a step of making the oxide semiconductor a conductor is performed without performing the (v) pixel electrode formation process described below.

The (iv) source formation process is a process of forming the source wiring 120S, the source electrode, and the drain electrode, and is performed by a general method.

The (v) pixel electrode formation process is a process of forming the pixel electrode 130 on the upper layer of a thick part of the gate insulating film 112 (that is, the first region A1). This process is performed by a general method. For example, the pixel electrode 130 can be formed by forming a transparent conductive film by a sputtering method or the like using a material of the pixel electrode 130 and patterning the transparent conductive film. Indium tin oxide (ITO), indium zinc oxide (IZO), zinc oxide (AZO) containing aluminum, or the like is used for the transparent conductive film. Further, silver (Ag) nano wires or the like can also be used as long as silver (Ag) nano wires have conductivity and are transparent.

The (vi) interlayer insulating film/protection film formation process is a process of forming the interlayer insulating film (also referred to as a protection film) 140 to cover the pixel electrode 130. This may be performed by a general method using the materials described above.

The (vii) common electrode formation process is a process of forming the common electrode 150 on the interlayer insulating film 140. This process is performed by a general method. For example, the common electrode 150 provided with the slit 150S can be formed by forming a transparent conductive film by a sputtering method or the like using a material of the common electrode 150 and patterning the transparent conductive film. The material of the transparent conductive film is as described above in the (v) pixel electrode formation process. The first substrate 100 can be produced as described above.

(II) Production of Second Substrate

The second substrate 200 can be produced according to a method for producing a counter substrate included in the liquid crystal display in the general FFS mode.

That is, for example, the BM layer 220 is formed on the second support substrate 210, and patterning is performed by photolithography or the like to have a desired matrix pattern. Next, each resist material of the red color filter 230R, the green color filter 230G, and the blue color filter 230B is sequentially formed by spin coat, slit coat, or the like, and patterned by photolithography or the like, and thus the CF layer 230 is formed. Thereafter, the overcoat layer 240 is formed on the upper layers of the BM layer 220 and the CF layer 230 by spin coat, slit coat, or the like. Furthermore, depending on the need, a transparent organic insulating film material is formed on the upper layer of the overcoat layer 240 by spin coat, slit coat, or the like, and photo spacers are patterned at desired positions. The second substrate 200 can be produced as described above.

In the present embodiment, the aspect in which the second substrate 200 includes the CF layer 230 is described, but the CF layer 230 may be provided on the first substrate 100 instead of the second substrate 200. In a case where the CF layer is provided on the first substrate 100, the CF layer is not formed on the second substrate 200.

Modification Example 1

In Embodiment 1, the surface of the pixel electrode 130 on the liquid crystal layer 300 side protrudes to the liquid crystal layer 300 side from the surface of the third common electrode on the liquid crystal layer 300 side. However, also in a case where the surface of the pixel electrode 130 on the liquid crystal layer 300 side has the same height as the surface of the third common electrode on the liquid crystal layer side, the same effect as that of Embodiment 1 can be exhibited. That is, in the present modification example, in Embodiment 1, the surface of the pixel electrode 130 on the liquid crystal layer 300 side has the same height as the surface of the third common electrode on the liquid crystal layer side. In order to have such an aspect, the thickness H1 of the first region A1 may be adjusted.

Modification Example 2

In Embodiment 1, those having a negative value for Δε are used as the liquid crystal molecules contained in the liquid crystal layer 300. However, even when Δε has a positive value, the same effect as that of Embodiment 1 can be exhibited. That is, in the present modification example, in Embodiment 1, the liquid crystal molecules having a positive value of Δε are used as the liquid crystal molecules contained in the liquid crystal layer 300.

Embodiment 2

In the present embodiment, characteristics unique to the present embodiment will be mainly described, and description of contents overlapping those of the above Embodiment 1 will be omitted. The present embodiment is substantially the same as Embodiment 1, except that a step difference portion is covered with a pixel electrode.

Figure 7:
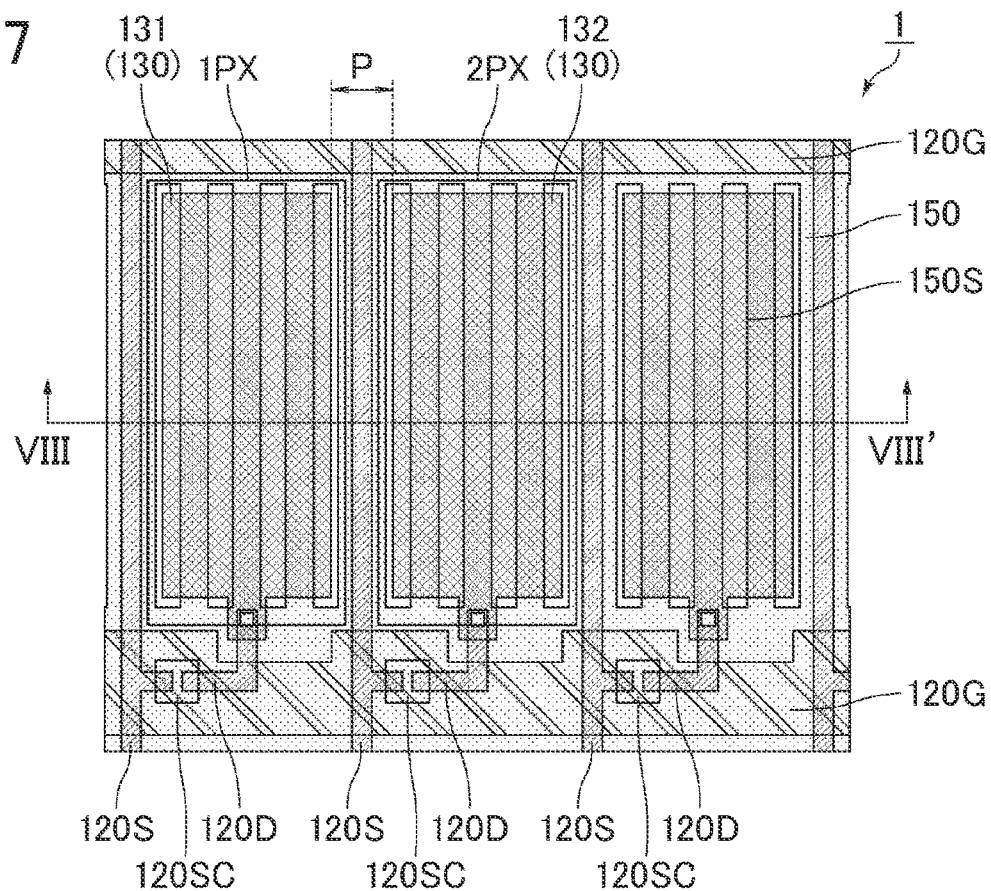
FIG. 7 is a schematic plan view of a liquid crystal display according to Embodiment 2.
Figure 8:
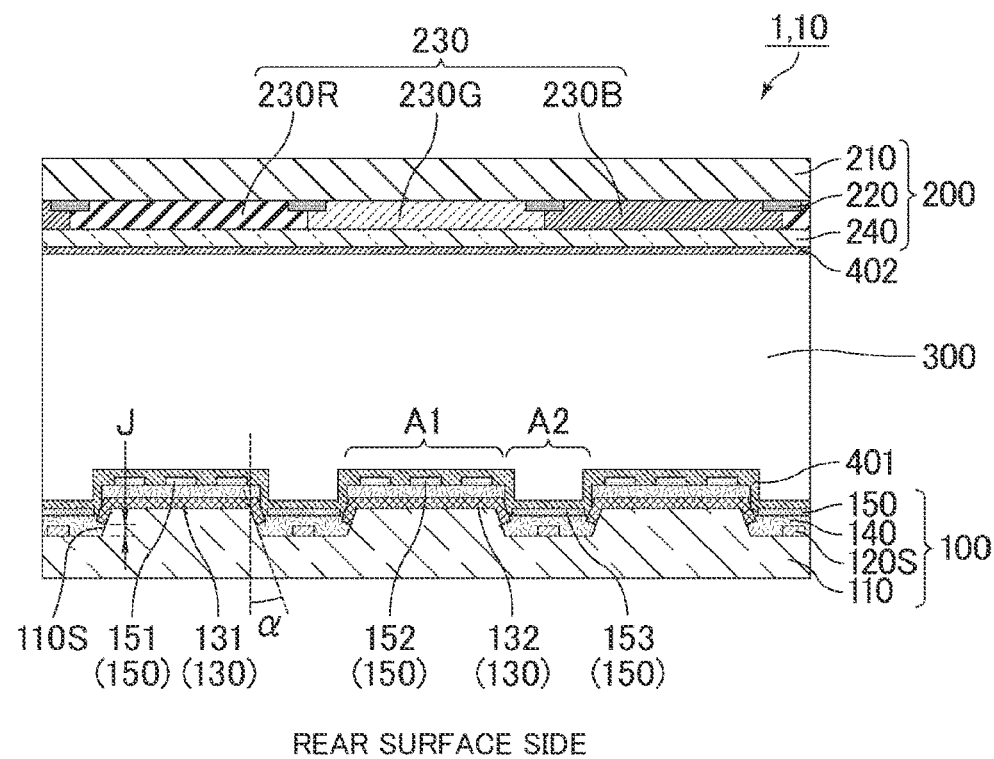
FIG. 8 is a schematic cross-sectional view (sectional view taken along the line VIII-VIII') taken along the line VIII-VIII' of FIG. 7 as a cut surface.

FIG. 7 is a schematic plan view of the liquid crystal display (and the liquid crystal panel 10) according to the present embodiment. FIG. 8 is a schematic cross-sectional view (sectional view taken along the line VIII-VIII') taken along the line VIII-VIII' of FIG. 7 as a cut surface. As illustrated in FIGS. 7 and 8, the liquid crystal display 1 (and the liquid crystal panel 10) of the present embodiment includes the first pixel 1PX and the second pixel 2PX contiguous to each other, and includes the first substrate 100, the liquid crystal layer 300, and the second substrate 200 in order from the rear surface side toward the observation surface side. The liquid crystal display 1 also includes the backlight 20 (refer to FIG. 3). The liquid crystal display 1 (and the liquid crystal panel 10) further includes the first alignment film 401 between the first substrate 100 and the liquid crystal layer 300, and includes the second alignment film 402 between the second substrate 200 and the liquid crystal layer 300 (refer to FIG. 8).

Figure 9:
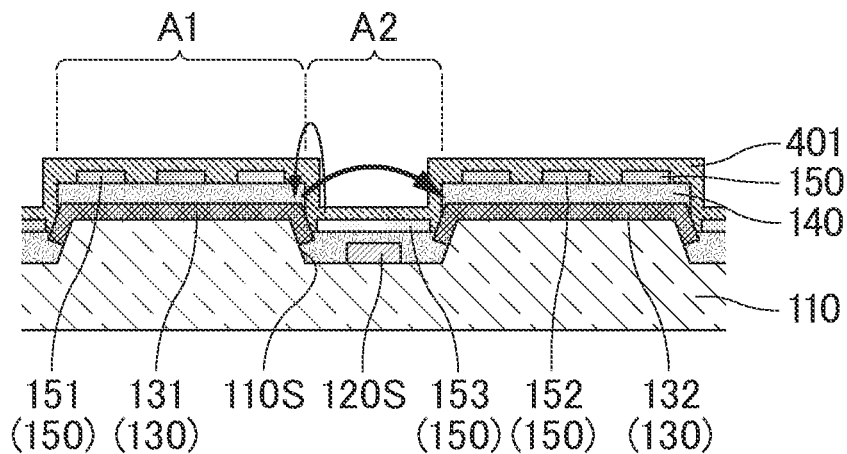
FIG. 9 is a view in which an electric field generated in the liquid crystal display according to Embodiment 2 is examined.

In the present embodiment, the side surface portion 110S (corresponding to the step difference portion 110S) of the lower layer member 110 on which the pixel electrode 130 is disposed is also covered with the pixel electrode 130 (refer to FIG. 8). That is, in Embodiment 1, the pixel electrode 130 is disposed only on the upper surface of the lower layer member 110 (refer to FIG. 2), but in the present embodiment, the pixel electrode 130 is disposed not only on the upper surface portion of the lower layer member 110 but also on the side surface portion 110S (refer to FIG. 8). In this case, the transverse electric field in the inter-pixel space is further strengthened as compared with Embodiment 1 (refer to FIG. 9). Due to this influence, the liquid crystal molecules of the liquid crystal layer overlapping the pixel edge can be more easily aligned, and the voltage can be lowered compared to Embodiment 1, and thus the transmittance of the pixel edge is further improved. FIG. 9 is a view in which an electric field generated in the liquid crystal display according to the present embodiment is examined. In FIG. 9, arrows representing the transverse electric field generated in the inter-pixel space are represented by thicker lines than in FIG. 5, indicating that the transverse electric field generated in the inter-pixel space is strong.

Here, in a cross-sectional view, when the distance between the lower end of the pixel electrode 130 covering the step difference portion 110S and the surface of the second region A2 of the lower layer member 110 on the liquid crystal layer 300 side in the normal direction of the bottom surface of the lower layer member 110 is defined as J (refer to FIG. 8), J is preferably 0 nm or more and 10 nm or less from the viewpoint of making the transverse electric field of the inter-pixel space P stronger than in Embodiment 1. J is preferably 0 nm. That is, the entire step difference portion 110S is particularly preferably covered with the pixel electrode 130.

In the present embodiment, the step difference portion 110S is provided obliquely to the bottom surface of the lower layer member 110 in a cross-sectional view. Here, "the step difference portion is provided obliquely to the bottom surface of the lower layer member in a cross-sectional view" means the angle α (also referred to as a taper angle of the step difference portion 110S) formed by the normal direction of the bottom surface of the lower layer member and the step difference portion 110S in a cross-sectional view is more than 0° and less than 85°.

The taper angle α of the step difference portion 110S is preferably 1° or more, more preferably 3° or more, and even more preferably 5° or more from the viewpoint that the electric field of the inter-pixel space P is more horizontal. The taper angle α is preferably 60° or less from the viewpoint of restricting the process and not generating a vertical electric field of the inter-pixel space P. The taper angle α is more preferably 45° or less, and even more preferably 30° or less.

The liquid crystal display 1 (and the liquid crystal panel 10) of the present embodiment satisfies the following Formulae (2-1), (2-2), and (2-3).

$$y = (a2/G') + b2 \tag{2-1}$$

$$-0.066 \le a2 \le -0.013 \tag{2-2}$$

$$0.81 \le b2 \le 0.91 \tag{2-3}$$

In the formulae, y represents mode transmittance (%) when a voltage applied to the liquid crystal layer 300 is 4.4 to 6 V. More specifically, y is expressed by [(transmittance when voltage is applied (applied voltage=4.4 to 6 V) of the liquid crystal display 1 in which a pair of polarizing plates is disposed in a crossed Nicol state/transmittance when no voltage is applied (applied voltage=0 V) of the liquid crystal display 1 in which a pair of polarizing plates is disposed in a parallel Nicol state)×100]. a2 represents a coefficient. G' represents the difference G between the thickness H1 of the first region A1 and the thickness H2 of the second region A2, which is normalized by G=300 nm (when intentionally expressing this as a mathematical expression, "G'=G/300"). b2 represents the mode transmittance (%) when G' is infinite (∞). More specifically, b2 is expressed by [(transmittance of the liquid crystal display 1 (here, G' is infinite) in which a pair of polarizing plates is disposed in a crossed Nicol state when voltage is applied (applied voltage=4.4 to 6 V)/transmittance of the liquid crystal display 1 (here, G' is infinite) in which a pair of polarizing plates is disposed in a parallel Nicol state when no voltage is applied (applied voltage=0 V))×100]. Here, since G does not have to be equal to or more than the cell thickness (3.0 μm to 10 μm) in practical use, "when G' is infinite (∞)" means that G substantially corresponds to the case where G is equal to the cell thickness. In Example 2 described later, a simulation was performed when G was 3.0 μm which is the minimum value of the cell thickness, that is, G'=10 (refer to FIG. 28).

In the liquid crystal display of the present embodiment, even when the film thickness and the relative dielectric constant ε of the interlayer insulating film 140 and the relative dielectric constant ε of the gate insulating film 112 are changed, the relational expression of the above Formulae (2-1) to (2-3) can be satisfied. Therefore, the film thickness and the relative dielectric constant ε of the interlayer insulating film 140 and the relative dielectric constant ε of the gate insulating film 112 are not particularly limited. As the gate insulating film 112 and the interlayer insulating film 140, for example, the films described above in Embodiment 1 and the like are used.

The method for manufacturing the liquid crystal display of the present embodiment is the same as the method for manufacturing the liquid crystal display of Embodiment 1 except for the (ii) GI formation process of the above (I).

Figure 10A:
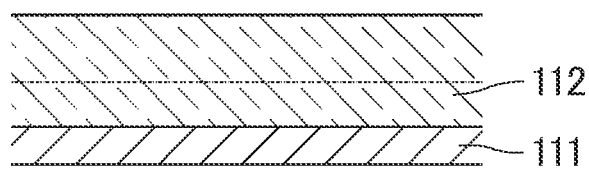
FIG. 10A is a view for describing one step of the gate insulating film formation process in the method for manufacturing the liquid crystal display according to Embodiment 2.
Figure 10B:
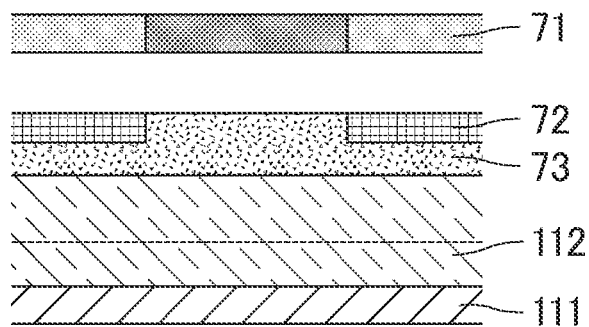
FIG. 10B is a view for describing one step of the gate insulating film formation process in the method for manufacturing the liquid crystal display according to Embodiment 2.
Figure 10C:
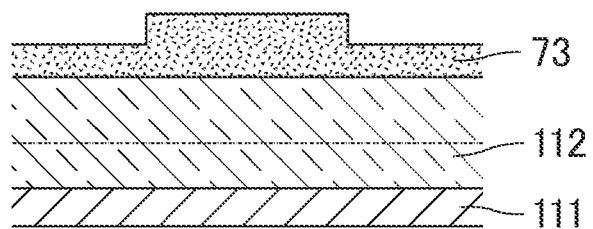
FIG. 10C is a view for describing one step of the gate insulating film formation process in the method for manufacturing the liquid crystal display according to Embodiment 2.
Figure 10D:
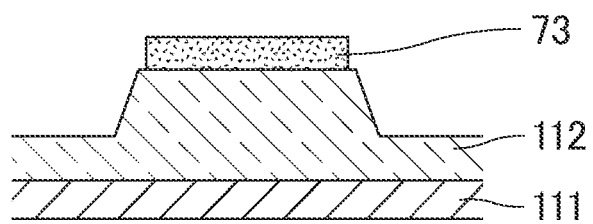
FIG. 10D is a view for describing one step of the gate insulating film formation process in the method for manufacturing the liquid crystal display according to Embodiment 2.
Figure 10E:
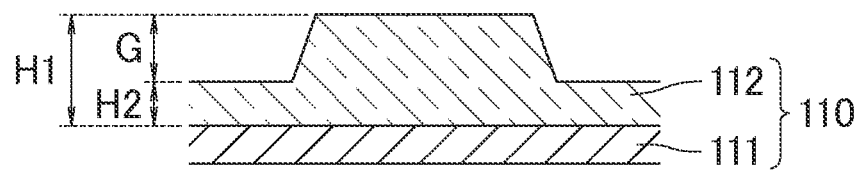
FIG. 10E is a view for describing one step of the gate insulating film formation process in the method for manufacturing the liquid crystal display according to Embodiment 2.

In the (ii) GI formation process of the present embodiment, first, when applying the material of the gate insulating film, the thickness of the obtained deposition film is increased (refer to FIG. 10A). That is, the deposition film in this process has a thickness larger than that of a normal deposition film by the thickness difference G. Thereafter, a positive photoresist is applied, and exposure and development are performed through a halftone photomask 71. At that time, as the photomask 71, the photomask 71 of which the width in the planar direction (width in the left-right direction in the drawing) is narrower than that of Embodiment 1 is used (refer to FIG. 10B). Then, the photoresist film 73 is patterned (refer to FIG. 10C). Next, etching is performed in a state where a part of the photoresist film 73 is left. At this time, by making the etching time shorter than that in Embodiment 1, the gate insulating film 112 has a tapered portion (step difference portion 110S), and a region of which the width in the planar direction is narrower than that of each pixel electrode 130 can be provided (refer to FIG. 10D). Thereafter, the photoresist film 73 is peeled off (refer to FIG. 10E). As a result, the pixel electrode 130 covers not only the upper surface of the gate insulating film 112 but also the side surface (that is, the step difference portion 110S) in the following normal process. AS described above, the gate insulating film 112 of the present embodiment is formed. The obtained gate insulating film 112 has the thickness difference G (refer to FIG. 10E). FIGS. 10A to 10E are views for describing each step in the gate insulating film formation process in the present embodiment.

Embodiment 3

In the present embodiment, characteristics unique to the present embodiment will be mainly described, and description of contents overlapping those of the above Embodiment 2 (and 1) will be omitted. The present embodiment is substantially the same as Embodiment 2, except that a flattening layer is further provided.

FIG. 11 is a schematic plan view of the liquid crystal display (and the liquid crystal panel 10) according to the present embodiment. FIG. 12 is a schematic cross-sectional view (sectional view taken along the line XII-XII') taken along the line XII-XII' of FIG. 11 as a cut surface. As illustrated in FIGS. 11 and 12, the liquid crystal display 1 (and the liquid crystal panel 10) of the present embodiment includes the first pixel 1PX and the second pixel 2PX contiguous to each other, and includes the first substrate 100, the liquid crystal layer 300, and the second substrate 200 in order from the rear surface side toward the observation surface side. The liquid crystal display 1 also includes the backlight 20 (refer to FIG. 3). The liquid crystal display 1 (and the liquid crystal panel 10) further includes the first alignment film 401 between the first substrate 100 and the liquid crystal layer 300, and includes the second alignment film 402 between the second substrate 200 and the liquid crystal layer 300 (refer to FIG. 12).

The first substrate 100 includes the lower layer member 110, the first pixel electrode 131 and the second pixel electrode 132 which are disposed corresponding to each of the first pixel 1PX and the second pixel 2PX, the interlayer insulating film 140, the common electrode 150, and a flattening layer 160 in order toward the liquid crystal layer 300 side. The common electrode 150 is provided with a plurality of parallel slits 150S.

The flattening layer (also referred to as a flattening film) 160 has a function of flattening a base of the first alignment film 401. As the flattening film 160, for example, it is preferable to use an organic insulating film that can be created by a solution method. In addition, an inorganic insulating film such as an oxide such as $SiO_2$ or $TiO_2$ or a silicon-based compound such as $SiNx$ or $SiNO$, which can be liquidized by a sol-gel method, can also be used. As will be described later, the flattening layer 160 is not particularly limited as long as the flattening layer 160 has an insulation property. That is, for example, as the flattening layer 160, an organic insulating film can also be used, a PAS film such as a SiNx film can also be used, or an inorganic insulating film containing $SiO_2$, $SiNO$, $TiO_2$, or the like can also be used. However, a PAS film (SiNx film) is most preferable.

In the present embodiment, it is preferable to adjust a thickness Q of the flattening layer 160 such that the common electrode (that is, the first common electrode 151 and the second common electrode 152) overlapping the pixel electrode 130 disposed in the first region A1 does not protrude to the liquid crystal layer 300 side (does not protrude to the liquid crystal layer 300 side). Here, in a cross-sectional view, when the distance between the lower end of the pixel electrode 130 covering the step difference portion 110S and the surface of the second region A2 of the lower layer member 110 on the liquid crystal layer 300 side in the normal direction of the bottom surface of the lower layer member 110 is defined as J (refer to FIG. 12), it is preferable to satisfy the relational expression: $(J+Q) \geq H1$. Specifically, Q is preferably 490 to 2,000 μm, and more preferably 540 to 1,800 μm.

Figure 13:
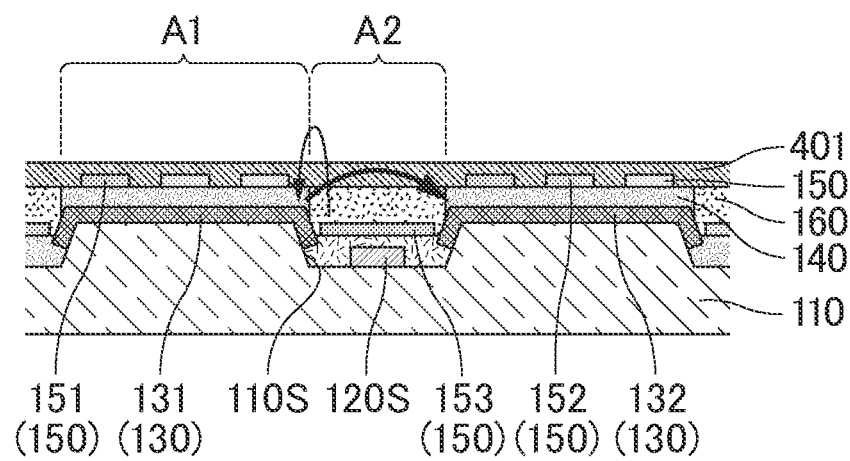
FIG. 13 is a view in which an electric field generated in the liquid crystal display according to Embodiment 3 is examined.

In the present embodiment, similar to Embodiment 2, the step difference portion 110S of the lower layer member 110 on which the pixel electrode 130 is disposed is also covered with the pixel electrode 130 (refer to FIG. 12). In this case, the transverse electric field between the pixel electrodes is further strengthened as compared with Embodiment 1 (refer to FIG. 13). As a result, the transmittance of the pixel edge is further improved. FIG. 13 is a view in which an electric field generated in the liquid crystal display according to the present embodiment is examined. In FIG. 13, arrows representing the transverse electric field generated in the inter-pixel space are represented by thicker lines than in FIG. 5, indicating that the transverse electric field generated in the inter-pixel space is strong.

On the other hand, in Embodiments 1 and 2, the pixel electrode 130 is disposed at a position protruding to the liquid crystal layer 300 side from the third common electrode 153 in a cross-sectional view, and accordingly, a transverse electric field in the inter-pixel space can sufficiently reach the liquid crystal layer 300. However, as a result of further examination by the present inventor, in Embodiments 1 and 2, the first region A1 in which the pixel electrode 130 is disposed protrudes to the liquid crystal layer 300, and thus it was found that the liquid crystal molecules were scattered due to this influence, and the contrast (also referred to as CR) may not be within a preferable range (refer to Example 3 below). Therefore, in the present embodiment, in the production process of the first substrate 100, after the (vii) common electrode formation process, by performing the (viii) flattening film formation process, the flattening film 160 is provided, and accordingly, the CR of the liquid crystal display is improved.

The method for manufacturing the liquid crystal display according to the present embodiment is the same as the method for manufacturing the liquid crystal display in Embodiment 2 except that, in the above (i), the (viii) flattening film formation process is performed after the (vii) common electrode formation process.

Figure 14:
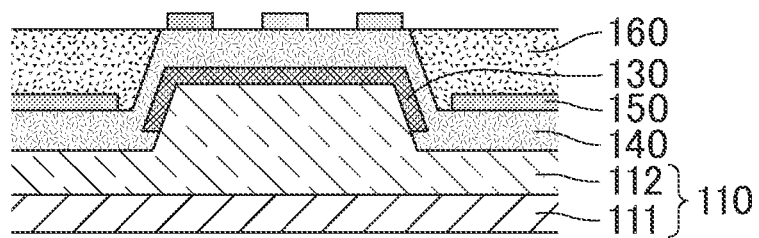
FIG. 14 is a schematic cross-sectional view schematically illustrating a layer configuration of a first substrate obtained through a (viii) flattening film formation process in the method for manufacturing the liquid crystal display according to Embodiment 3.

The (viii) flattening film formation process may be performed by a general method. For example, the upper surface of the laminate obtained in the (vii) common electrode formation process (that is, more specifically, the upper surface of the common electrode 150 or the interlayer insulating film 140) is coated with a material of the flattening film and then baked (refer to FIG. 14). FIG. 14 is a schematic cross-sectional view schematically illustrating a layer configuration of the first substrate obtained through the (viii) flattening film formation process.

Embodiment 4

In the present embodiment, characteristics unique to the present embodiment will be mainly described, and description of contents overlapping those of the above Embodiment 1 will be omitted. The present embodiment is substantially the same as Embodiment 1 except that the surface of the pixel electrode is positioned on the side opposite to the liquid crystal layer from the surface of the third common electrode on the liquid crystal layer side using the interlayer insulating film 140 in a cross-sectional view.

Figure 15:
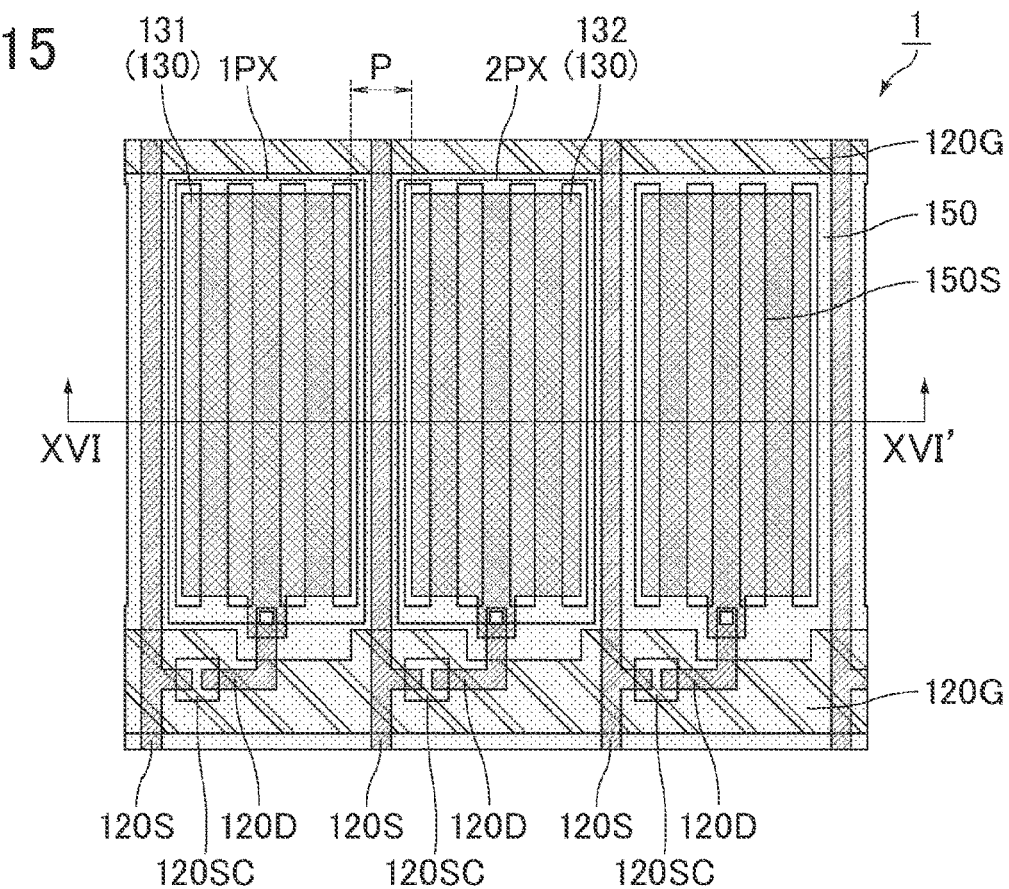
FIG. 15 is a schematic plan view of a liquid crystal display according to Embodiment 4.
Figure 16:
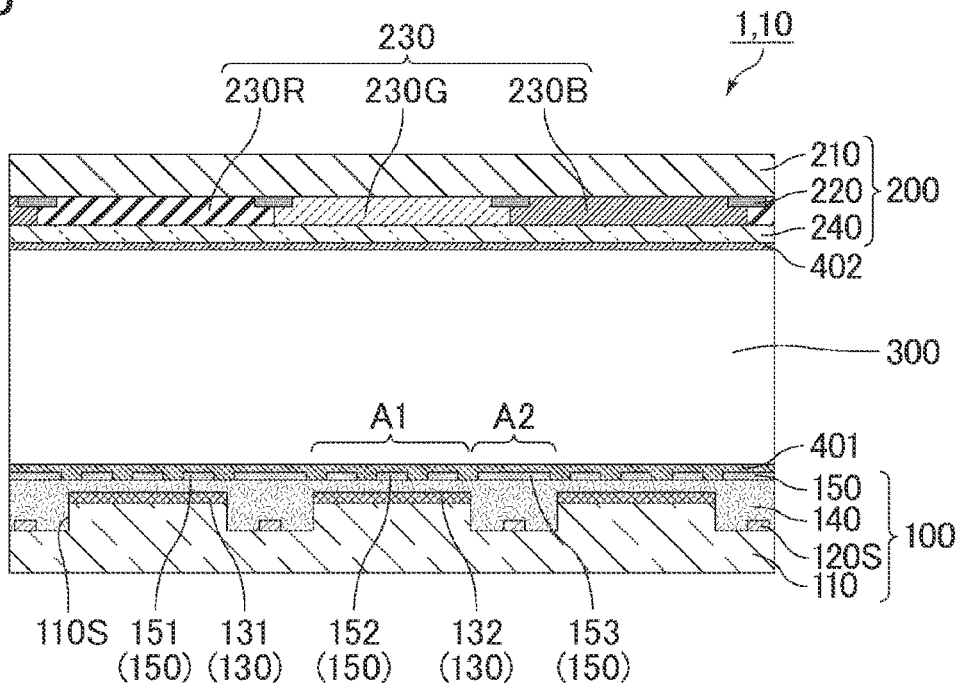
FIG. 16 is a schematic cross-sectional view (sectional view taken along the line XVI-XVI') taken along the line XVI-XVI' of FIG. 15 as a cut surface.

FIG. 15 is a schematic plan view of the liquid crystal display (and the liquid crystal panel 10) according to the present embodiment. FIG. 16 is a schematic cross-sectional view (sectional view taken along the line XVI-XVI') taken along the line XVI-XVI' of FIG. 15 as a cut surface. As illustrated in FIGS. 15 and 16, the liquid crystal display 1 (and the liquid crystal panel 10) of the present embodiment includes the first pixel 1PX and the second pixel 2PX contiguous to each other, and includes the first substrate 100, the liquid crystal layer 300, and the second substrate 200 in order from the rear surface side toward the observation surface side. The liquid crystal display 1 also includes the backlight 20 (refer to FIG. 3). The liquid crystal display 1 (and the liquid crystal panel 10) further includes the first alignment film 401 between the first substrate 100 and the liquid crystal layer 300, and includes the second alignment film 402 between the second substrate 200 and the liquid crystal layer 300 (refer to FIG. 16).

The thickness difference G (that is, H1−H2) between the first region A1 and the second region A2 is preferably equal to or more than the film thickness of the source wiring 120S. As a result, an electric field generated between the source wiring 120S (and the source electrode) and the pixel electrode 130 (for example, an electric field illustrated by a broken line in FIG. 17) is reduced, and thus the transmittance of the pixel edge is improved as described later. Specifically, the difference G is preferably 100 nm or more. The difference G is more preferably 150 nm or more, even more preferably 200 nm or more, and particularly preferably 300 nm or more. In order to obtain the flattening effect of the interlayer insulating film, G is preferably 1,000 nm or less. G is more preferably 800 nm or less, and even more preferably 600 nm or less.

In the present embodiment, in a cross-sectional view, the surface of the pixel electrode 130 is positioned closer to the side opposite to the liquid crystal layer 300 than the surface of the liquid crystal layer 300 side of the common electrode (third common electrode 153) overlapping the second region A2. In order to have such a structure, the thickness H1 of the first region A1 is preferably 500 nm or more. More preferably, H1 is 550 nm or more. In addition, H1 is preferably 2,000 nm or less. More preferably, H1 is 1,800 nm or less.

The thickness H2 of the second region A2 is, for example, preferably 100 nm or more and 1,900 nm or less (however, less than H1). More preferably, H2 is 150 nm or more and 1,650 nm or less.

Here, in the FFS/V3 mode in the related art, as described above, since the fringe electric field of the same polarity is applied to each pixel, the liquid crystal molecules are aligned and the VT performance occurs. On the other hand, although a transverse electric field is generated in the inter-pixel space because the polarity is different for each pixel, the transverse electric field is shielded by the common electrode, and the transverse electric field is unlikely to affect the liquid crystal layer. Further, as a result of further examination by the present inventor, in the FFS/V3 mode in the related art, since an electric field is affected by the source wiring 120S (and the source electrode) as illustrated by a broken line in FIG. 17, it was found that the influence of the transverse electric field on the liquid crystal layer became smaller (refer to FIG. 17).

Figure 17:
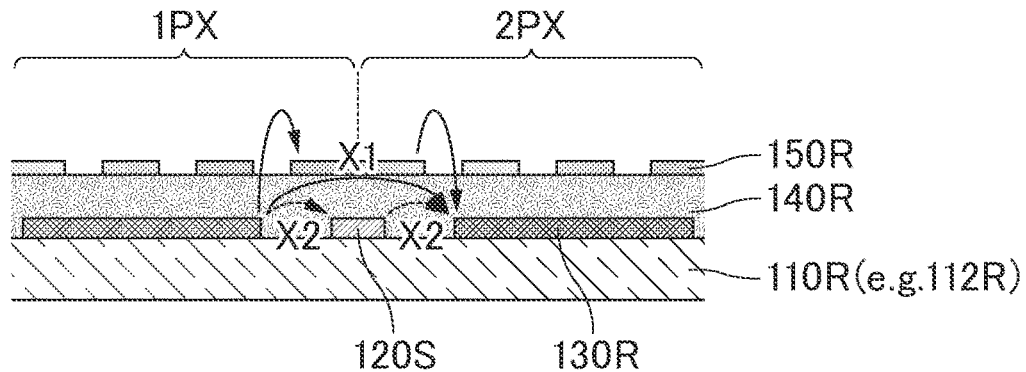
FIG. 17 is a view in which an electric field generated in the liquid crystal display in the FFS/V3 mode of the related art is examined.
Figure 18:
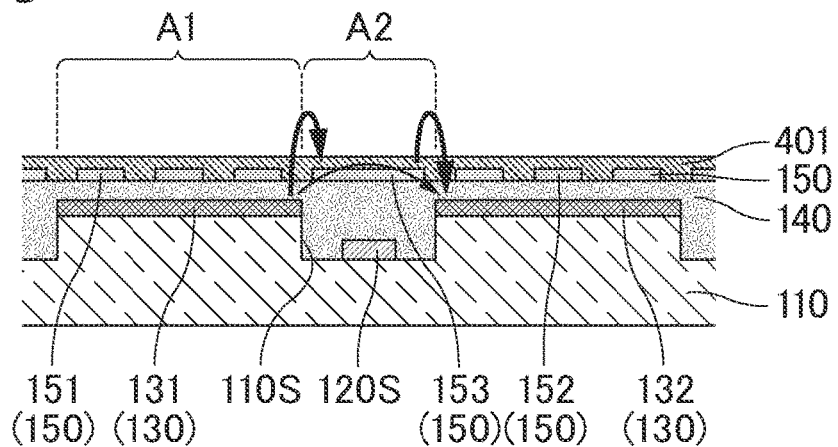
FIG. 18 is a view in which an electric field generated in the liquid crystal display according to Embodiment 4 is examined.

The present embodiment also adopts a configuration in which the electrode structure is not reversed (COM/Pix). However, even in such a configuration, by providing the thickness difference G between the first region A1 where the pixel electrode 130 is disposed and the second region A2, the electric field generated between the source wiring 120S (and the source electrode) and the pixel electrode 130 (for example, in FIG. 17, an electric field illustrated by X2) decreases or disappears. In this case, since the transverse electric field in the inter-pixel space is further strengthened than in the FFS/V3 mode in the related art (refer to FIG. 18), the electric field leaking to the liquid crystal layer 300 is strengthened, and the liquid crystal molecules of the liquid crystal layer overlapping the pixel edges can be aligned more easily. As a result, since the voltage can be reduced as compared with the FFS/V3 mode in the related art, the transmittance of the pixel edge is improved. FIG. 17 is a view in which an electric field generated in the liquid crystal display in the FFS/V3 mode of the related art is examined. FIG. 18 is a view in which an electric field generated in the liquid crystal display according to the present embodiment is examined. In FIG. 18, the arrows representing the electric field are represented by thicker lines than in FIG. 17, meaning that the electric field is strong.

As described above, the interlayer insulating film 140 is preferably a film that can insulate the conductive films from each other and has a certain relative dielectric constant. Specifically, an inorganic insulating film, an organic insulating film, or a laminate of an organic insulating film and an inorganic insulating film is preferable. Details of these are as described above. Among them, the insulating films described above as specific examples of the flattening layer 160 are preferable. That is, an organic insulating film that can be created by a solution method, or an inorganic insulating film such as an oxide such as $SiO_2$ or $TiO_2$ or a silicon-based compound such as SiNx and SiNO, which can be made a liquid by a sol-gel method, is preferable.

The method for manufacturing the liquid crystal display of the present embodiment is the same as the method for manufacturing the liquid crystal display of Embodiment 1 except for the (vi) interlayer insulating film/protection film formation process of the above (I).

In the (vi) interlayer insulating film/protection film formation process of the present embodiment, the flattening treatment is performed using the interlayer insulating film. That is, the (vi) interlayer insulating film/protection film formation process of the present embodiment can be rephrased as "(vi) interlayer insulating film/protection film/flattening film formation process".

Figure 19:
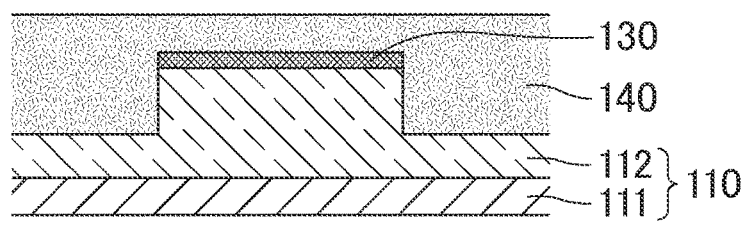
FIG. 19 is a schematic cross-sectional view schematically illustrating a layer configuration of a first substrate obtained through a (vi) interlayer insulating film/protection film/flattening film formation process in the method for manufacturing the liquid crystal display according to Embodiment 4.

The (vi) interlayer insulating film/protection film/flattening film formation process is a process of performing the flattening treatment using the interlayer insulating film 140. The flattening treatment may be performed by a general method. Here, it is preferable that the film formation is performed by a wet method instead of the film formation by a dry method such as the CVD method which is commonly used when forming an interlayer insulating film (refer to FIG. 19). FIG. 19 is a schematic cross-sectional view schematically illustrating a layer configuration of the first substrate obtained through the (vi) interlayer insulating film/protection film/flattening film formation process.

Embodiment 5

In the present embodiment, characteristics unique to the present embodiment will be mainly described, and description of contents overlapping those of the above Embodiment 4 will be omitted. The present embodiment is substantially the same as Embodiment 4, except that a step difference portion is covered with a pixel electrode.

Figure 20:
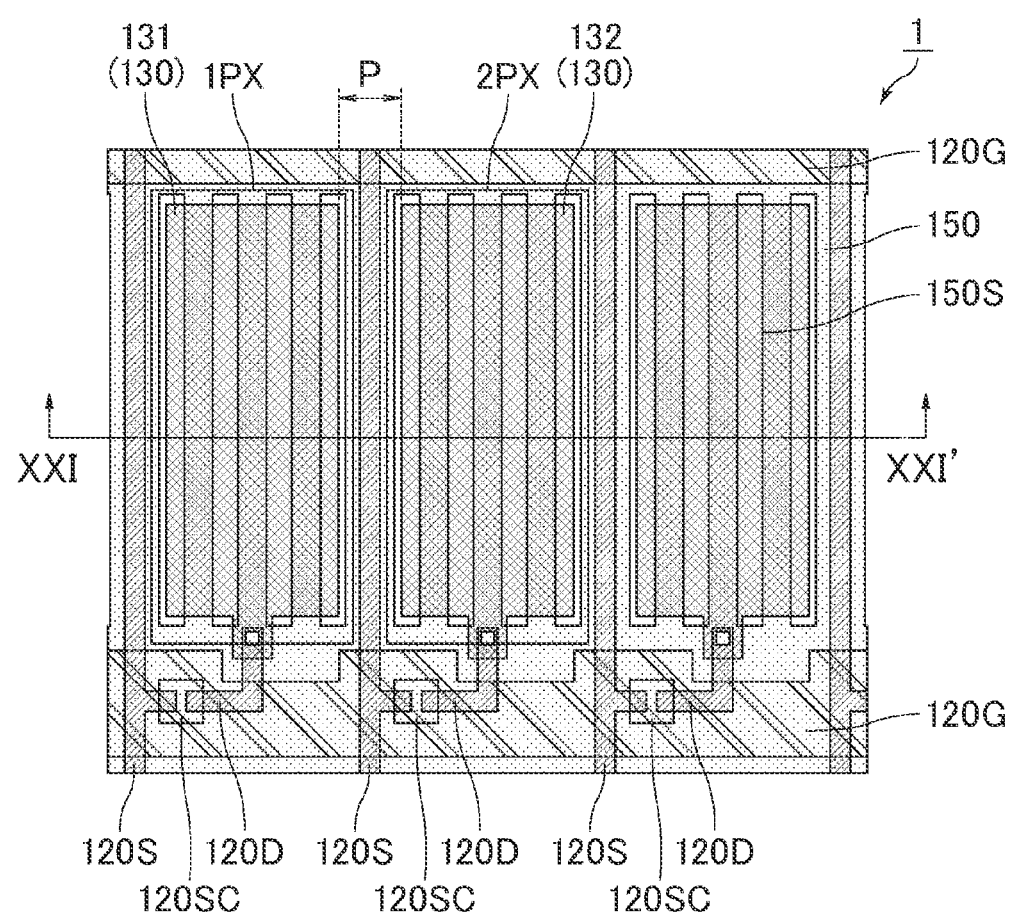
FIG. 20 is a schematic plan view of a liquid crystal display according to Embodiment 5.
Figure 21:
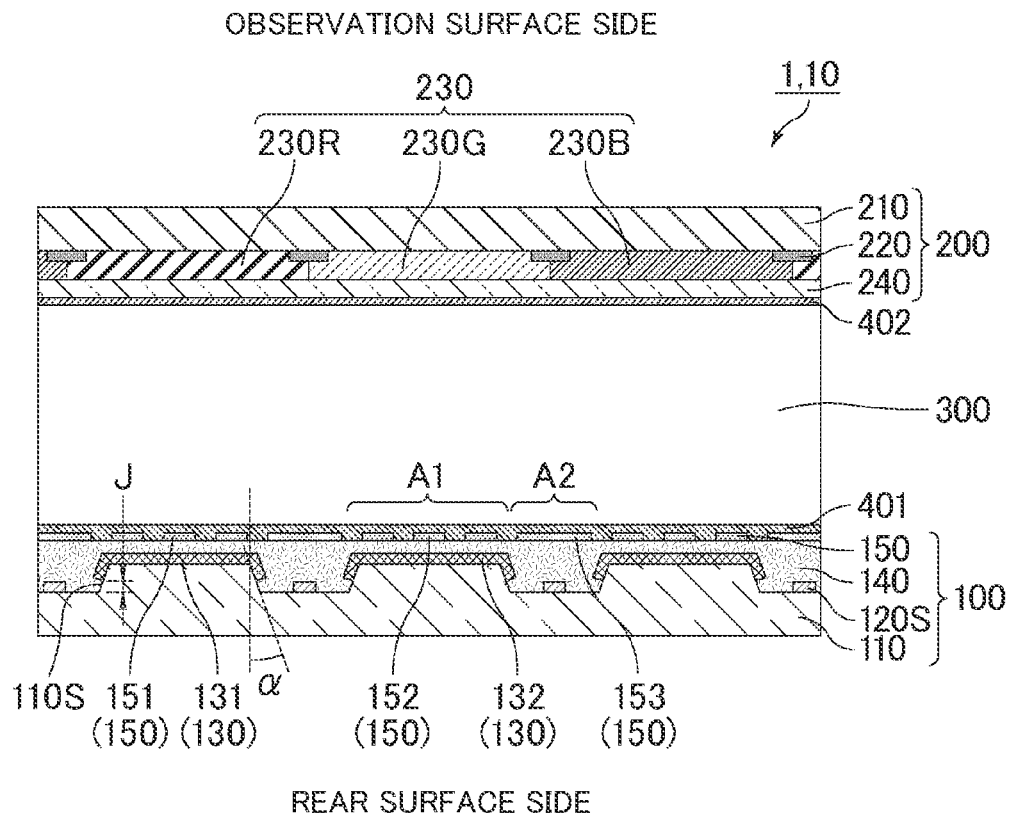
FIG. 21 is a schematic cross-sectional view (sectional view taken along the line XXI-XXI') taken along the line XXI-XXI' of FIG. 20 as a cut surface.

FIG. 20 is a schematic plan view of the liquid crystal display (and the liquid crystal panel 10) according to the present embodiment. FIG. 21 is a schematic cross-sectional view (sectional view taken along the line XXI-XXI') taken along the line XXI-XXI' of FIG. 20 as a cut surface. As illustrated in FIGS. 20 and 21, the liquid crystal display 1 (and the liquid crystal panel 10) of the present embodiment includes the first pixel 1PX and the second pixel 2PX contiguous to each other, and includes the first substrate 100, the liquid crystal layer 300, and the second substrate 200 in order from the rear surface side toward the observation surface side. The liquid crystal display 1 also includes the backlight 20 (refer to FIG. 3). The liquid crystal display 1 (and the liquid crystal panel 10) further includes the first alignment film 401 between the first substrate 100 and the liquid crystal layer 300, and includes the second alignment film 402 between the second substrate 200 and the liquid crystal layer 300 (refer to FIG. 21).

Figure 22:
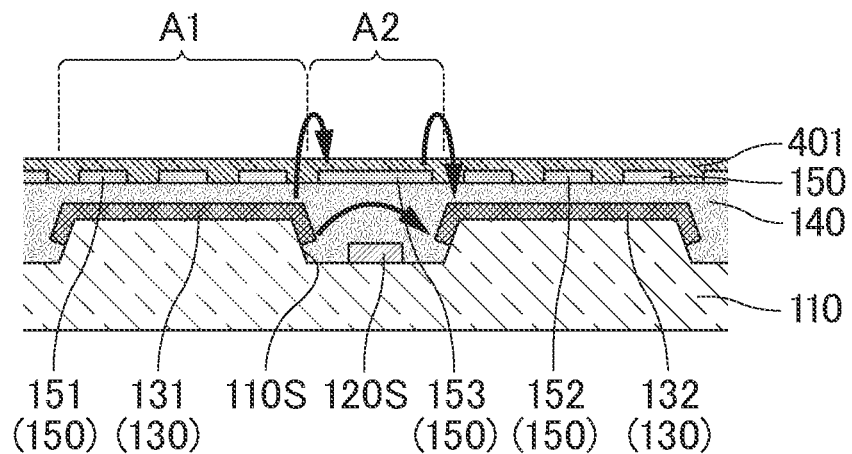
FIG. 22 is a view in which an electric field generated in the liquid crystal display according to Embodiment 5 is examined.

In the present embodiment, the side surface portion 110S (step difference portion 110S) of the lower layer member 110 on which the pixel electrode 130 is disposed is also covered with the pixel electrode 130 (refer to FIG. 20). That is, in Embodiment 4, the pixel electrode 130 is disposed only on the upper surface of the lower layer member 110 (refer to FIG. 16), but in the present embodiment, the pixel electrode 130 is disposed not only on the upper surface portion of the lower layer member 110 but also on the side surface portion 110S (refer to FIG. 21). In this case, the transverse electric field between the pixel electrodes is further strengthened as compared with Embodiment 1 (refer to FIG. 22). Due to this influence, the liquid crystal molecules of the liquid crystal layer overlapping the pixel edge can be more easily aligned, and the voltage can be lowered compared to Embodiment 4, and thus the transmittance of the pixel edge is further improved. FIG. 22 is a view in which an electric field generated in the liquid crystal display according to the present embodiment is examined. In FIG. 22, the arrows representing the electric field are represented by thicker lines than in FIG. 17, meaning that the electric field is strong.

Here, in a cross-sectional view, when the distance between the lower end of the pixel electrode 130 covering the step difference portion 110S and the surface of the second region A2 of the lower layer member 110 on the liquid crystal layer 300 side in the normal direction of the bottom surface of the lower layer member 110 is defined as J (refer to FIG. 21), J is preferably 0 nm or more and 10 nm or less from the viewpoint of making the transverse electric field of the inter-pixel space P stronger than in Embodiment 1. J is preferably 0 nm. That is, the entire step difference portion 110S is particularly preferably covered with the pixel electrode 130.

In the present embodiment, the step difference portion 110S is provided obliquely to the bottom surface of the lower layer member 110 in a cross-sectional view. The taper angle α of the step difference portion 110S is preferably 1° or more, more preferably 3° or more, and even more preferably 5° or more from the viewpoint that the electric field of the inter-pixel space P is more horizontal. The taper angle α is preferably 60° or less from the viewpoint of restricting the process and not generating a vertical electric field of the inter-pixel space P. The taper angle α is more preferably 45° or less, and even more preferably 30° or less.

The liquid crystal display 1 (and the liquid crystal panel 10) of the present embodiment satisfies the following Formulae (3-1), (3-2), and (3-3).

$$y = (a3/G') + b3 \quad (3\text{-}1)$$

$$-0.072 \le a3 \le -0.022 \quad (3\text{-}2)$$

$$0.79 \le b3 \le 0.91 \quad (3\text{-}3)$$

In the formulae, y represents mode transmittance (%) when a voltage applied to the liquid crystal layer 300 is 4.4 to 6 V. More specifically, y is expressed by [(transmittance when voltage is applied (applied voltage=4.4 to 6 V) of the liquid crystal display 1 in which a pair of polarizing plates is disposed in a crossed Nicol state/transmittance when no voltage is applied (applied voltage=0 V) of the liquid crystal display 1 in which a pair of polarizing plates is disposed in a parallel Nicol state)×100]. a3 represents a coefficient. G' represents the difference G between the thickness H1 of the first region A1 and the thickness H2 of the second region A2, which is normalized by G=300 nm (when intentionally expressing this as a mathematical expression, "G'=G/300"). b3 represents the mode transmittance (%) when G' is infinite (∞). More specifically, b3 is expressed by [(transmittance of the liquid crystal display 1 (here, G' is infinite) in which a pair of polarizing plates is disposed in a crossed Nicol state when voltage is applied (applied voltage=4.4 to 6 V)/transmittance of the liquid crystal display 1 (here, G' is infinite) in which a pair of polarizing plates is disposed in a parallel Nicol state when no voltage is applied (applied voltage=0 V))×100].

Here, since G does not have to be equal to or more than the cell thickness (3.0 µm to 10 µm) in practical use, "when G' is infinite (∞)" means that G substantially corresponds to the case where G is equal to the cell thickness. In Example 5 described later, a simulation was performed when G was 3.0 µm which is the minimum value of the cell thickness, that is, G'=10 (refer to FIG. 39).

In the liquid crystal display of the present embodiment, even when the film thickness and the relative dielectric constant ε of the interlayer insulating film 140 and the relative dielectric constant ε of the gate insulating film 112 are changed, the relational expression of the above Formulae (3-1) to (3-3) can be satisfied. Therefore, the film thickness and the relative dielectric constant ε of the interlayer insulating film 140 and the relative dielectric constant ε of the gate insulating film 112 are not particularly limited. As the gate insulating film 112 and the interlayer insulating film 140, for example, the films described above in Embodiment 1 and the like are used.

The method for manufacturing the liquid crystal display of the present embodiment is the same as the method for manufacturing the liquid crystal display of Embodiment 4 except for the (ii) GI formation process of the above (I). The (ii) GI formation process of the present embodiment is performed in the same manner as the (ii) GI formation process of Embodiment 2.

The embodiments of the present disclosure have been described above, and the described individual matters can be all applied to the present disclosure as a whole.

The present disclosure will be described in more detail below with reference to examples and comparative examples, but the present disclosure is not limited to these examples. For the simulation, Expert LCD (3D-LCD simulator manufactured by LinkGlobal21) was used.

Example 1

The liquid crystal display of the present example corresponds to the liquid crystal display of Embodiment 1 described above (refer to FIGS. 1 to 6E). As an example of the liquid crystal display of the present example, the VT performance was simulated for an example in which the interlayer insulating film 140 is made of a PAS film (SiNx film) using liquid crystal molecules having Δε=−3.4 as liquid crystal molecules contained in the liquid crystal layer 300 (refer to FIGS. 23 to 25). Table 1 shows the mode transmittance and CR when the voltage applied to the liquid crystal=5 V and G=500 nm.

Figure 23:
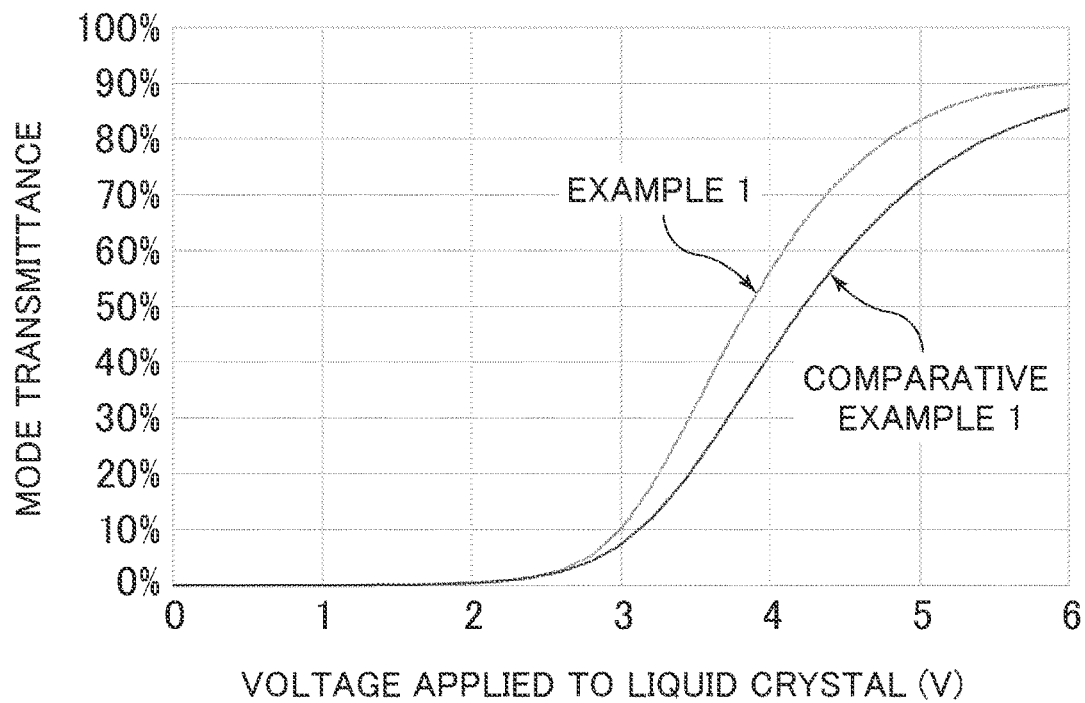
FIG. 23 is a simulation result of a liquid crystal display according to Example 1.
Figure 24:
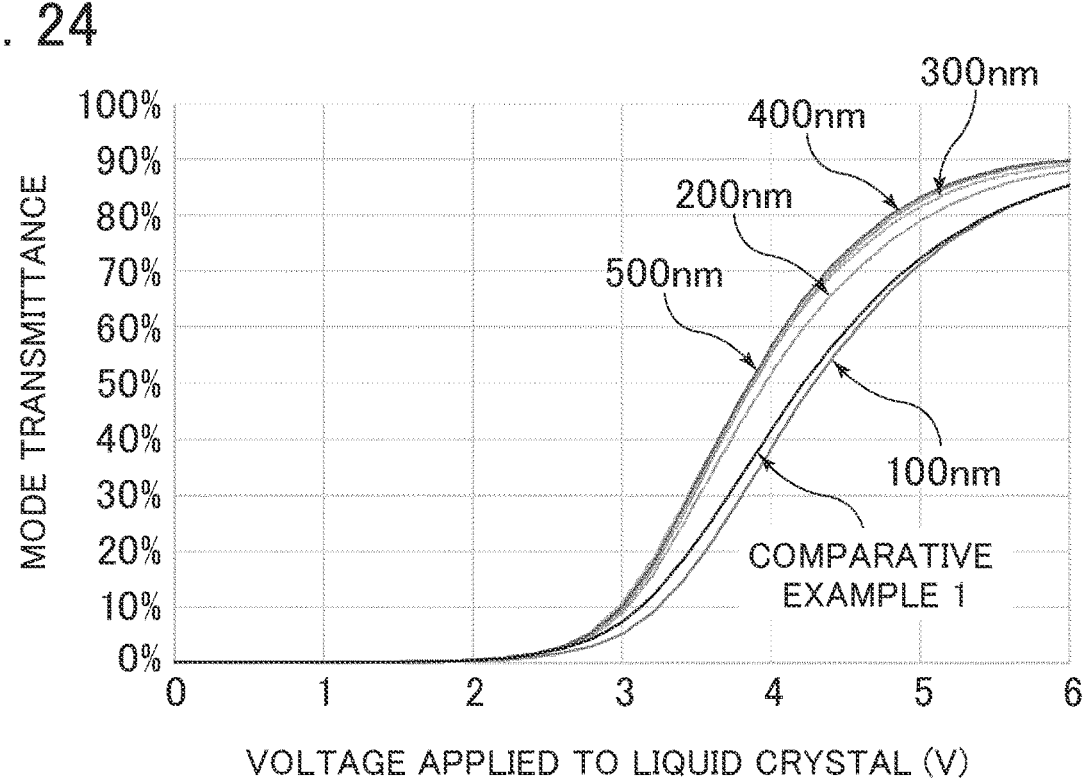
FIG. 24 is a simulation result of the liquid crystal display according to Example 1.
Figure 25:
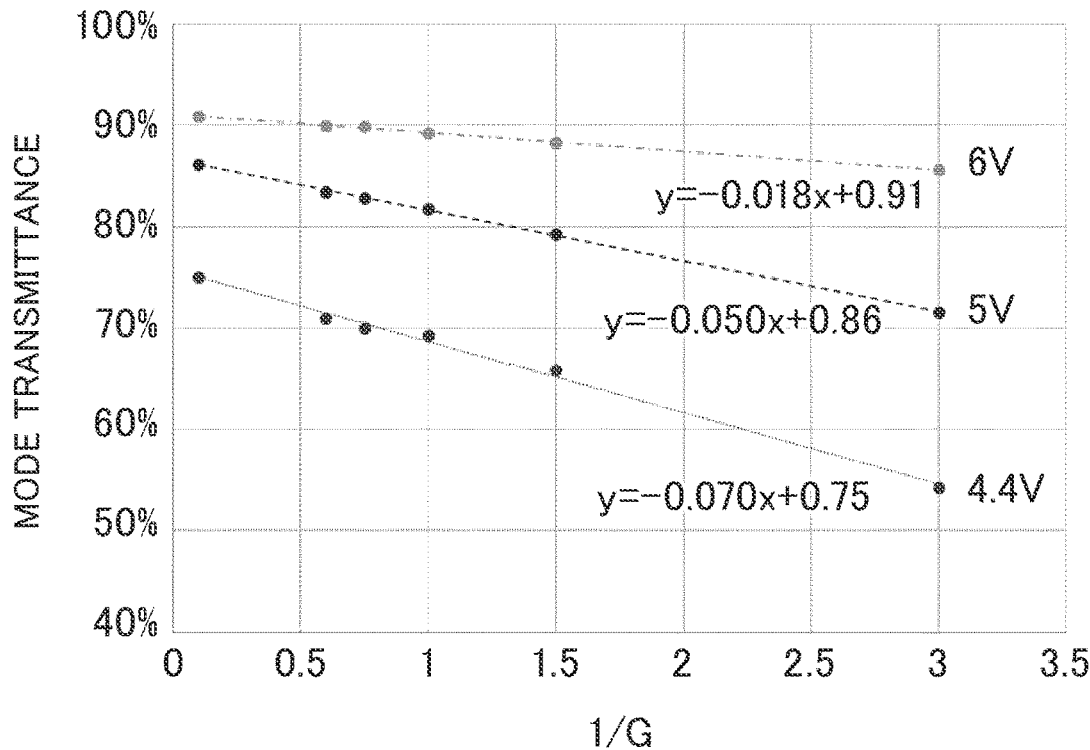
FIG. 25 is a simulation result of the liquid crystal display according to Example 1.

FIG. 23 is a graph illustrating the VT performance when G is 500 nm and the voltage applied to the liquid crystal is 0 to 6 V. FIG. 24 is a graph illustrating the VT performance when G is set to 100 nm, 200 nm, 300 nm, 400 nm, and 500 nm, respectively, and the voltage applied to the liquid crystal is set to 0 to 6 V, in order to examine the influence of G on the mode transmittance. FIG. 25 is a graph illustrating the relationship between the mode transmittance and (1/G') when the voltage applied to the liquid crystal is set to 4.4 V, 5 V, and 6 V, respectively. FIGS. 23 and 24 also show simulation results for the liquid crystal display in the FFS/V3 mode of the related art as Comparative Example 1.

From FIG. 23, it can be seen that a lower voltage of about 0.2 V or more may be used in Example 1 as compared with Comparative Example 1 to obtain the same mode transmittance. Further, when the voltage applied to the liquid crystal=5 V, it can be confirmed that the mode transmittance is improved by about 15% in Example 1 as compared with Comparative Example 1. Furthermore, from FIG. 24, it can be seen that lower voltage driving can be realized when the thickness difference G increases.

From FIG. 25, when examining the relationship between the mode transmittance y and G', it can be confirmed that there is a relationship expressed by the following Formula (1-1): y=(a1/G')+b1 (1-1) (in the formula, y represents mode transmittance (%). b1 represents the mode transmittance (%) when G' is infinite (∞)).

Specifically, when the voltage applied to the liquid crystal (voltage applied to the liquid crystal layer 300) is 5 V, it was found that the inclination a1=−0.05 and b1=0.86 (refer to FIG. 25). On the other hand, the coefficient and the like change for each voltage applied to the liquid crystal. In the case of the present example, it was also found that, when performing calculation in the voltage range (4.4 to 6 V) often used as a white voltage in the structure of the FFS/V3 mode, −0.070≤a1≤−0.018, and 0.75≤b1≤0.91 (refer to FIG. 25).

Here, even when the film thickness and the relative dielectric constant ε of the PAS film and the relative dielectric constant ε of the gate insulating film (GI) are changed, these are within the above Formulae (1-1) to (1-3), and thus it was also found that these conditions were not particularly limited. Therefore, for example, there is no particular problem even when an organic insulating film is used as the gate insulating film (GI), or the PAS film is changed to SiO2, SiNO, TiO2, or the like. In the simulation, a liquid crystal molecule having a negative Δε was used, but it was also confirmed that a liquid crystal molecule having a positive Δε had the same effect.

Example 2

The liquid crystal display of the present example corresponds to the liquid crystal display of Embodiment 2 described above (refer to FIG. 3 and FIGS. 7 to 10E). As an example of the liquid crystal display of the present example, the VT performance was simulated for an example in which the interlayer insulating film 140 is made of a PAS film (SiNx film) using liquid crystal molecules having Δε=−3.4 as liquid crystal molecules contained in the liquid crystal layer 300 (refer to FIGS. 26 to 30). Table 1 shows the mode transmittance and CR when the voltage applied to the liquid crystal=5 V, G=500 nm, J=0 nm, and α=10°.

Figure 26:
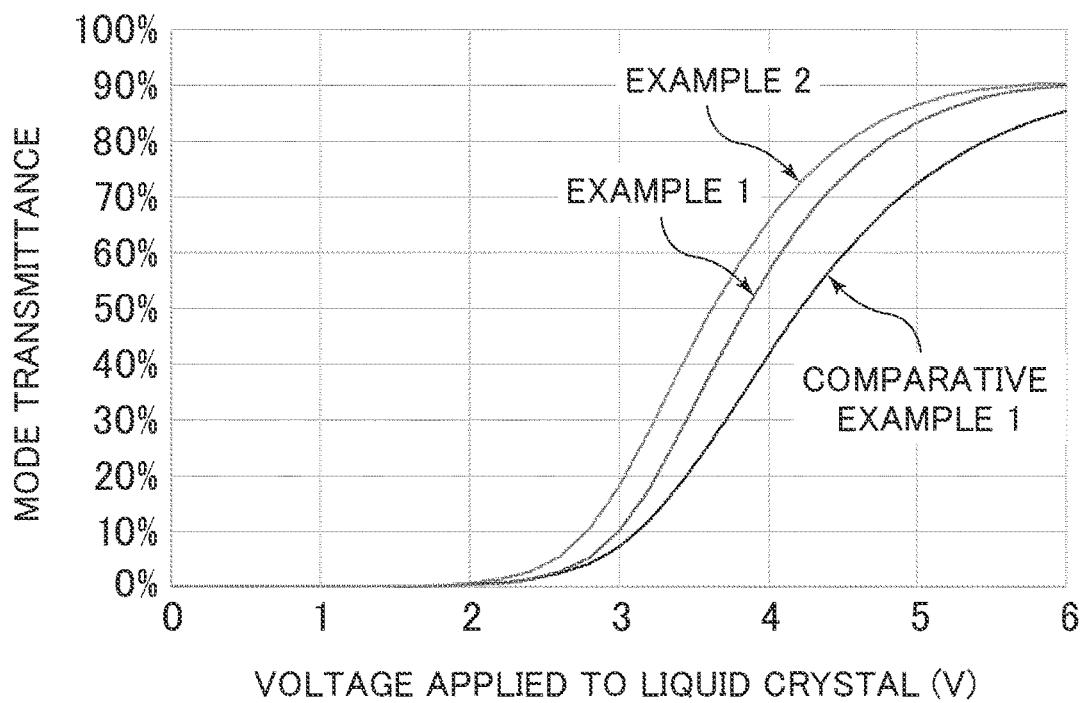
FIG. 26 is a simulation result of a liquid crystal display according to Example 2.
Figure 27:
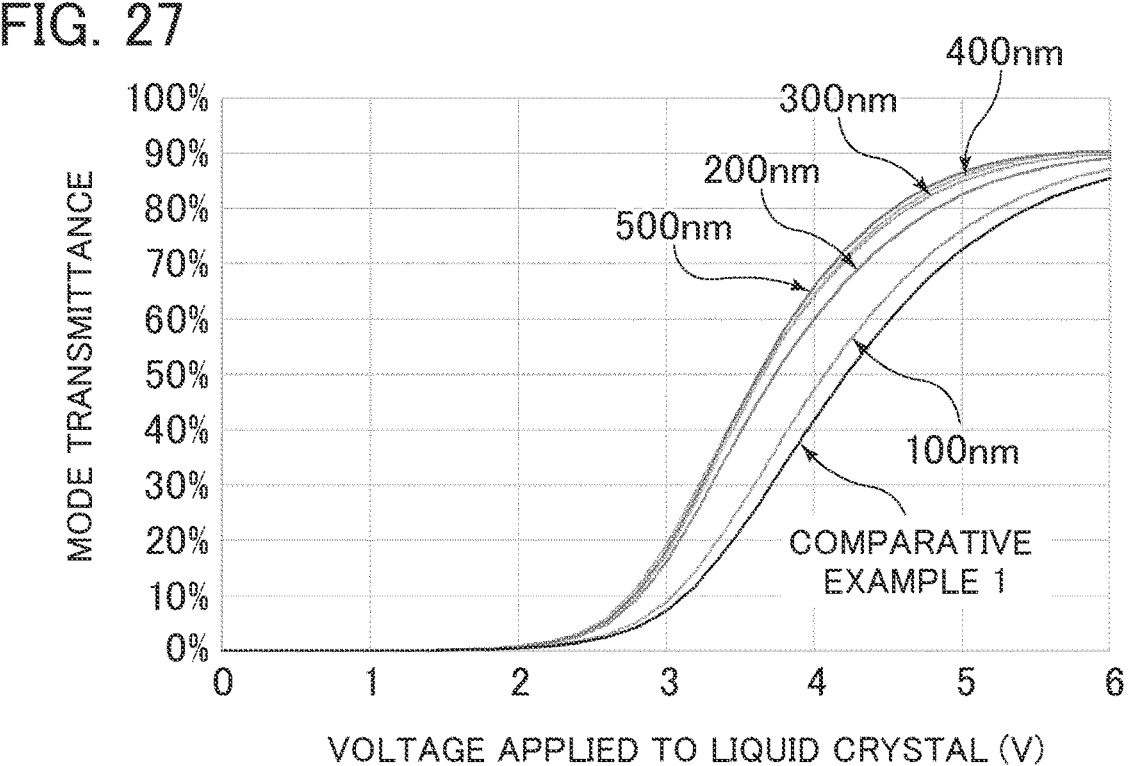
FIG. 27 is a simulation result of the liquid crystal display according to Example 2.
Figure 28:
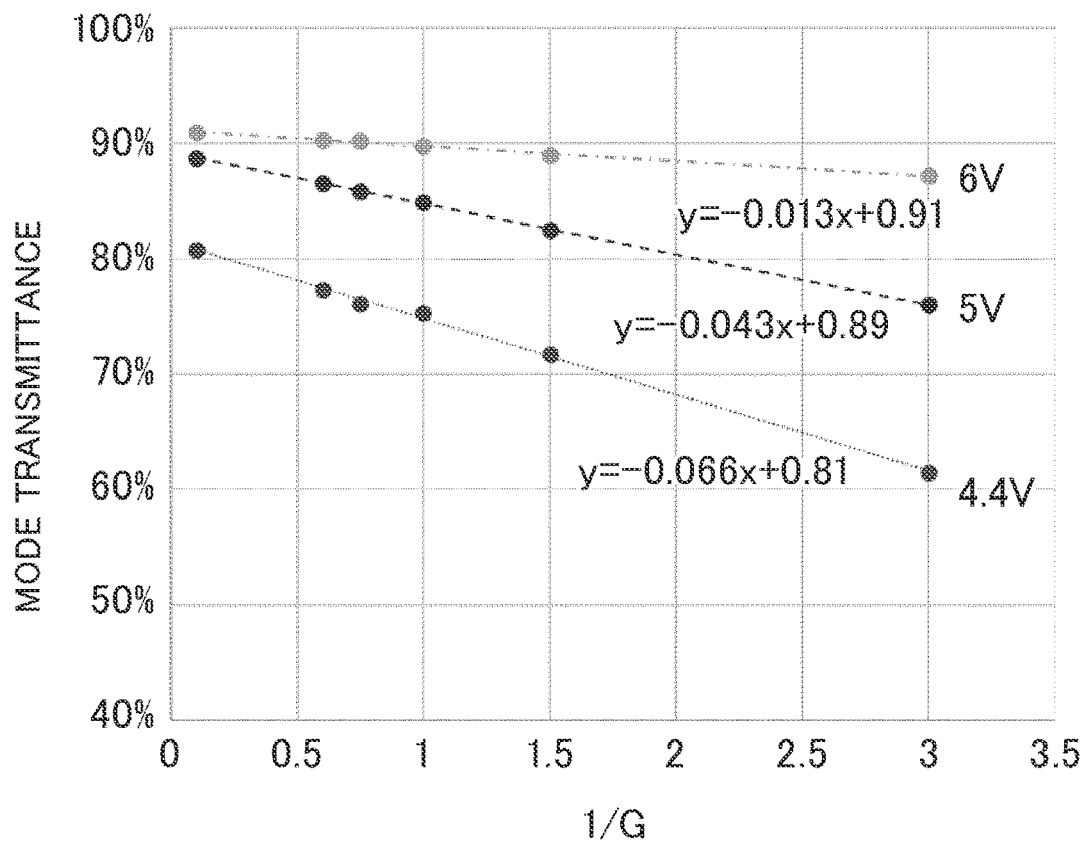
FIG. 28 is a simulation result of the liquid crystal display according to Example 2.

FIG. 26 is a graph illustrating the VT performance when G is 500 nm and the voltage applied to the liquid crystal is 0 to 6 V. FIG. 27 is a graph illustrating the VT performance when G is set to 100 nm, 200 nm, 300 nm, 400 nm, and 500 nm, respectively, and the voltage applied to the liquid crystal is set to 0 to 6 V, in order to examine the influence of G on the mode transmittance. FIG. 28 is a graph illustrating the relationship between the mode transmittance and (1/G') when the voltage applied to the liquid crystal is set to 4.4 V, 5 V, and 6 V, respectively. FIG. 26 shows the simulation results of Comparative Example 1 and Example 1, and FIG. 27 shows the simulation result of Comparative Example 1. In FIGS. 26 to 28, J=0 nm and α=5°.

Figure 29:
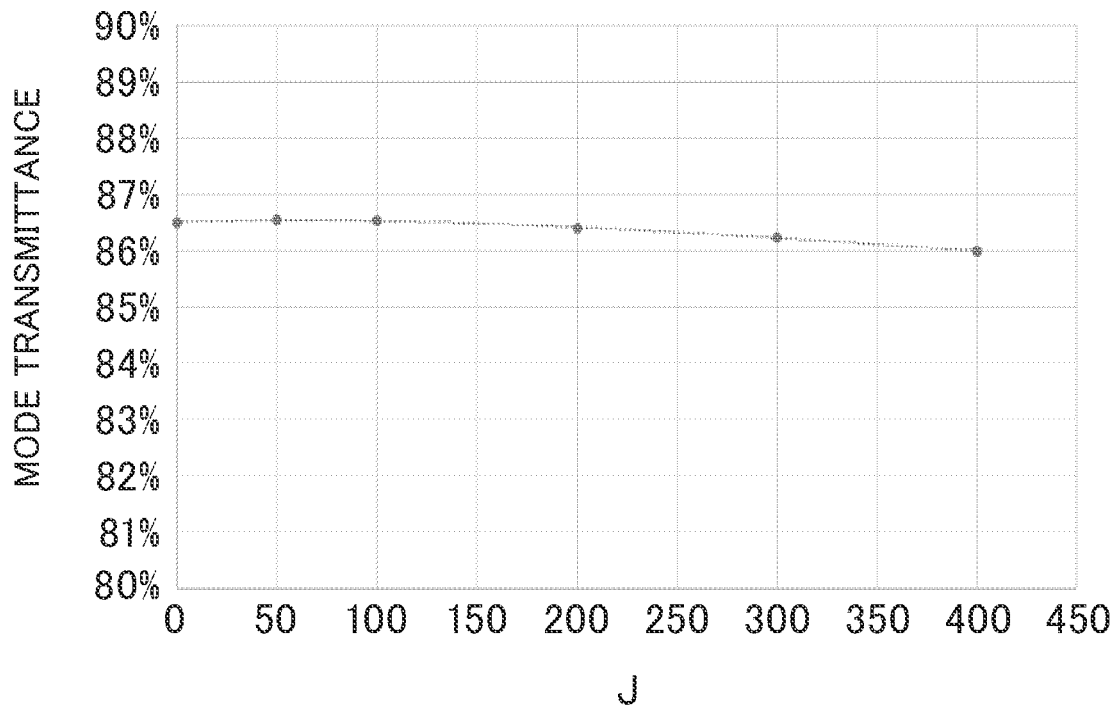
FIG. 29 is a simulation result of the liquid crystal display according to Example 2.
Figure 30:
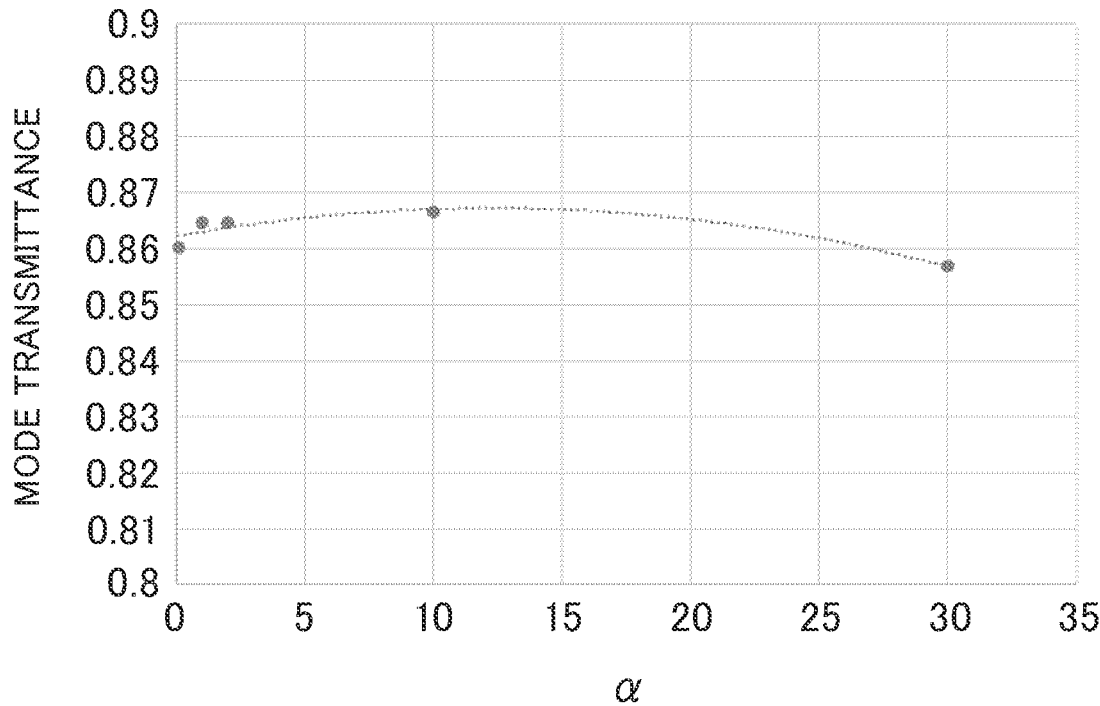
FIG. 30 is a simulation result of the liquid crystal display according to Example 2.

FIG. 29 is a graph illustrating the mode transmittance when G is set to 500 nm, J is set to 0 to 400 nm, and the voltage applied to the liquid crystal is set to 5 V, in order to examine the influence of J on the mode transmittance. FIG. 30 is a graph illustrating the mode transmittance when G is set to 500 nm, J is set to 0 nm, α=0 to 30°, and the voltage applied to the liquid crystal is set to 5 V, in order to examine the influence of the taper angle α on the mode transmittance.

From FIG. 26, it can be seen that a lower voltage of about 0.2 V or more may be used in Example 1 as compared with Comparative Example 1 to obtain the same mode transmittance. Further, when the voltage applied to the liquid crystal=5 V, it can be confirmed that the mode transmittance is improved by about 4% in Example 2 as compared with Example 1. Furthermore, from FIG. 27, it can be seen that lower voltage driving can be realized when the thickness difference G increases.

From FIG. 28, when examining the relationship between the mode transmittance y and G', it can be confirmed that there is a relationship expressed by the following Formula (2-1): y=(a2/G')+b2 (2-1) (in the formula, y represents mode transmittance (%). b2 represents the mode transmittance (%) when G' is infinite (∞)).

Specifically, when the voltage applied to the liquid crystal (voltage applied to the liquid crystal layer 300) is 5 V, it was found that the inclination a2=−0.043 and b2=0.89 (refer to FIG. 28). On the other hand, the coefficient and the like change for each voltage applied to the liquid crystal. In the case of the present example, it was also found that, when performing calculation in the voltage range (4.4 to 6 V) often used as a white voltage in the structure of the FFS/V3 mode, −0.073≤a2≤−0.018, and 0.77≤b2≤0.91 (refer to FIG. 28).

In the present example, even when the film thickness and the relative dielectric constant ε of the PAS film and the relative dielectric constant ε of the gate insulating film (GI) are changed, these are within the above Formulae (2-1) to (2-3), and thus it was also found that these conditions were not particularly limited. Therefore, for example, there is no particular problem even when an organic insulating film is used as the gate insulating film (GI), or the PAS film is changed to SiO2, SiNO, TiO2, or the like. In the simulation, a liquid crystal molecule having a negative Δε was used, but it was also confirmed that a liquid crystal molecule having a positive Δε had the same effect.

From FIG. 29, it can be seen that the mode transmittance is only different within 0.5% even when J is changed within the range of 0 to 400 nm. From FIG. 30, it can be seen that the mode transmittance is only different within 1% even when α is changed within the range of 0 to 30°. Therefore, it was found that J and α are not particularly limited as long as J and α are within these ranges. The mode transmittance is the highest when α=10° (refer to FIG. 30).

Example 3

The liquid crystal display of the present example corresponds to the liquid crystal display of Embodiment 3 described above (refer to FIG. 3 and FIGS. 11 to 14). As an example of the liquid crystal display of the present example, the VT performance was simulated for an example in which the interlayer insulating film 140 is made of a PAS film (SiNx film) and the flattening layer 160 is made of a PAS film (SiNx film; relative dielectric constant ε=6.9), using liquid crystal molecules having Δε=−3.4 as liquid crystal molecules contained in the liquid crystal layer 300 (refer to FIGS. 31 to 33). Table 1 shows the mode transmittance and CR when the voltage applied to the liquid crystal=5 V, G=500 nm, Q=500 nm, and α=5°.

Figure 31:
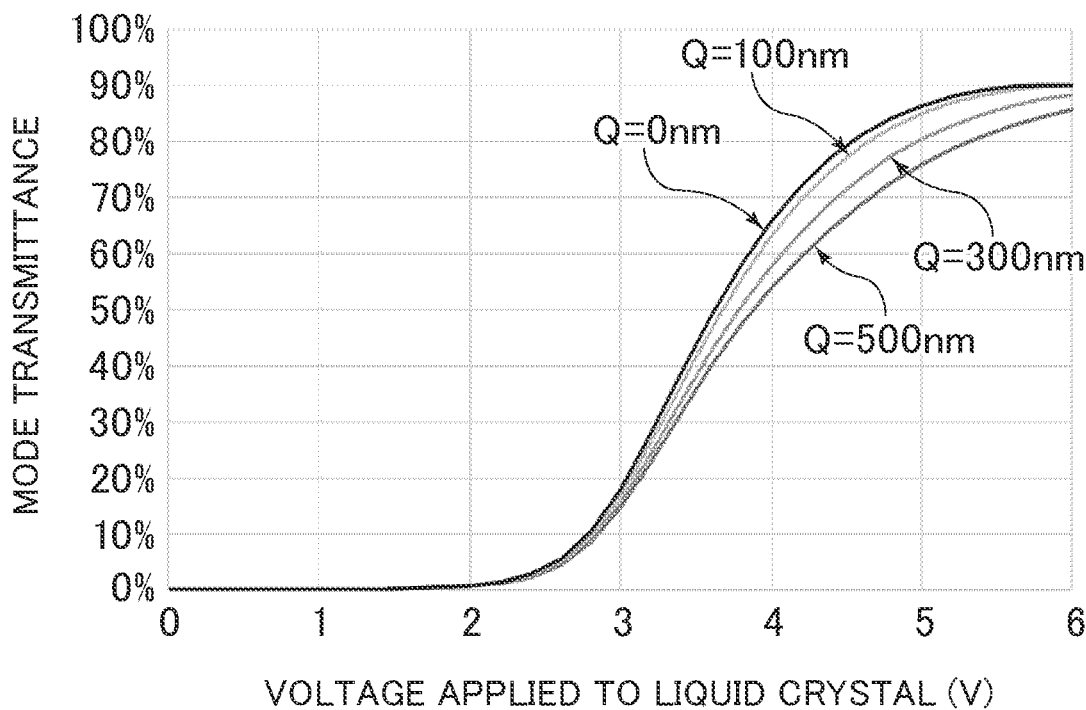
FIG. 31 is a simulation result of a liquid crystal display according to Example 3.
Figure 32:
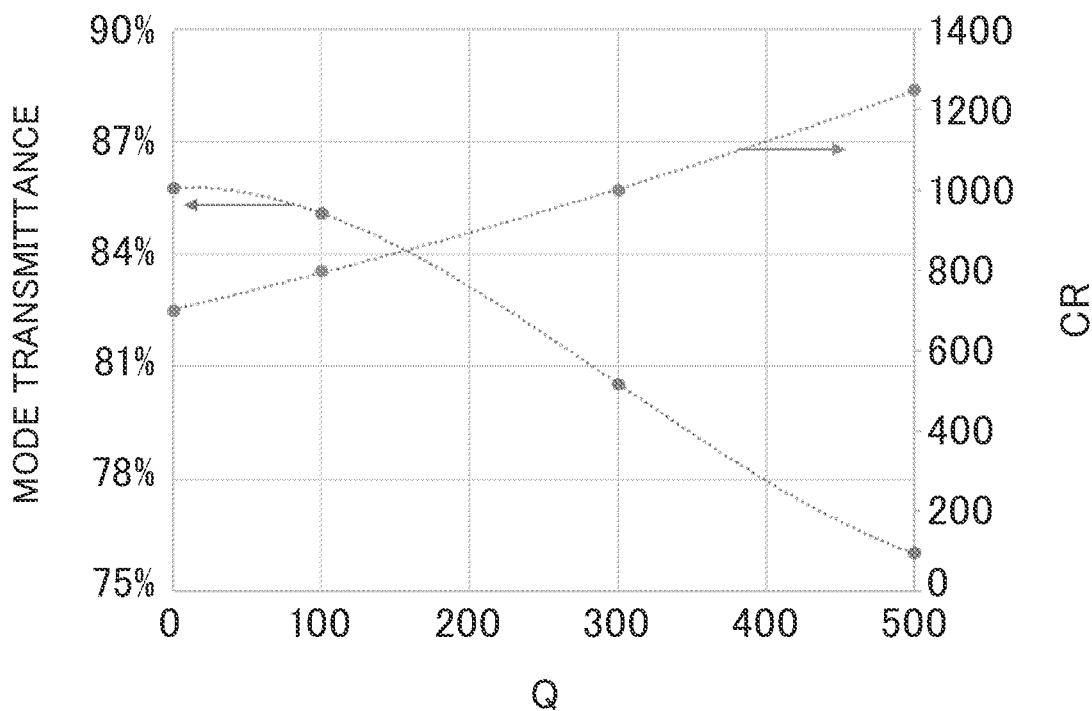
FIG. 32 is a simulation result of the liquid crystal display according to Example 3.
Figure 33:
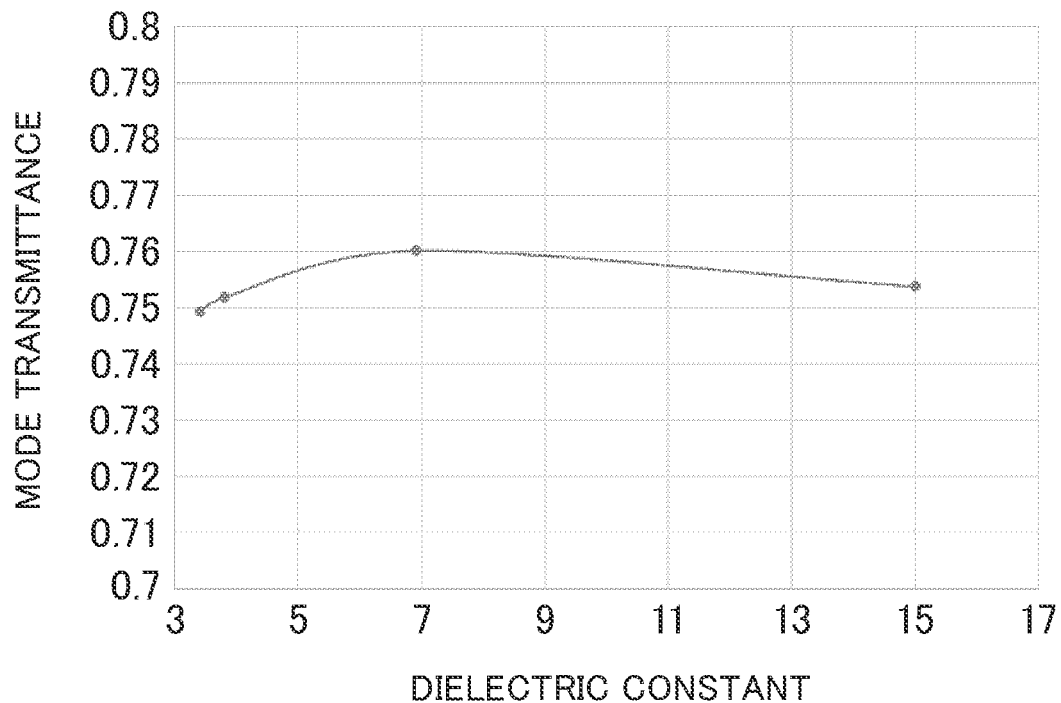
FIG. 33 is a simulation result of the liquid crystal display according to Example 3.

FIG. 31 is a graph illustrating the VT performance when Q is set to 0 nm, 100 nm, 300 nm, and 500 nm, respectively, and the voltage applied to the liquid crystal is set to 0 to 6 V, in order to examine the influence of the thickness Q of the flattening layer 160 on the mode transmittance. FIG. 32 is a graph illustrating the relationship between the mode transmittance or the contrast (CR) and the Q when the voltage applied to the liquid crystal is 5 V. FIG. 33 is a graph illustrating the mode transmittance when the voltage applied to the liquid crystal=5 V using the relative dielectric constant ε having about 3 to 15 as the flattening layer 160, in order to examine the influence of the difference in the flattening layer 160 on the mode transmittance.

It can be seen that, from FIG. 31, the larger the Q, the higher the voltage driving, and from the graph illustrating the relationship between the mode transmittance (left vertical axis) and Q in FIG. 32, the mode transmittance at 5 V decreases as the Q increases. On the other hand, from the graph illustrating the relationship between CR (right vertical axis) and Q in FIG. 32, it can be seen that CR is gradually improved by increasing Q, that is, by performing flattening by the flattening layer 160.

In FIGS. 31 and 32, a case where a PAS film (SiNx film; relative dielectric constant ε=6.9) was used as the flattening layer 160 was examined, and in FIG. 33, it was examined what would happen to the mode transmittance when the material of the flattening layer 160 was changed. From FIG. 33, it can be seen that the difference in the mode transmittance is only within about 1% even when a layer having the relative dielectric constant ε within the range of about 3 to 15 is used as the flattening layer 160. Therefore, it was found that the flattening layer 160 is not particularly limited as long as the flattening layer 160 has an insulation property. The mode transmittance is the highest when a layer having the relative dielectric constant ε=6.9, that is, a PAS film (SiNx film) is used as the flattening layer 160 (refer to FIG. 33).

Example 4

The liquid crystal display of the present example corresponds to the liquid crystal display of Embodiment 4 described above (refer to FIG. 3 and FIGS. 15 to 19). As an example of the liquid crystal display of the present example, the VT performance was simulated for an example in which the interlayer insulating film 140 is made of a PAS film (SiNx film) and the source film thickness (thickness of the source wiring 120S) is 175 nm, using liquid crystal molecules having $\Delta\varepsilon=-3.4$ as liquid crystal molecules contained in the liquid crystal layer 300 (refer to FIGS. 34 to 36). Table 1 shows the mode transmittance and CR when the voltage applied to the liquid crystal=5 V and G=300 nm.

Figure 34:
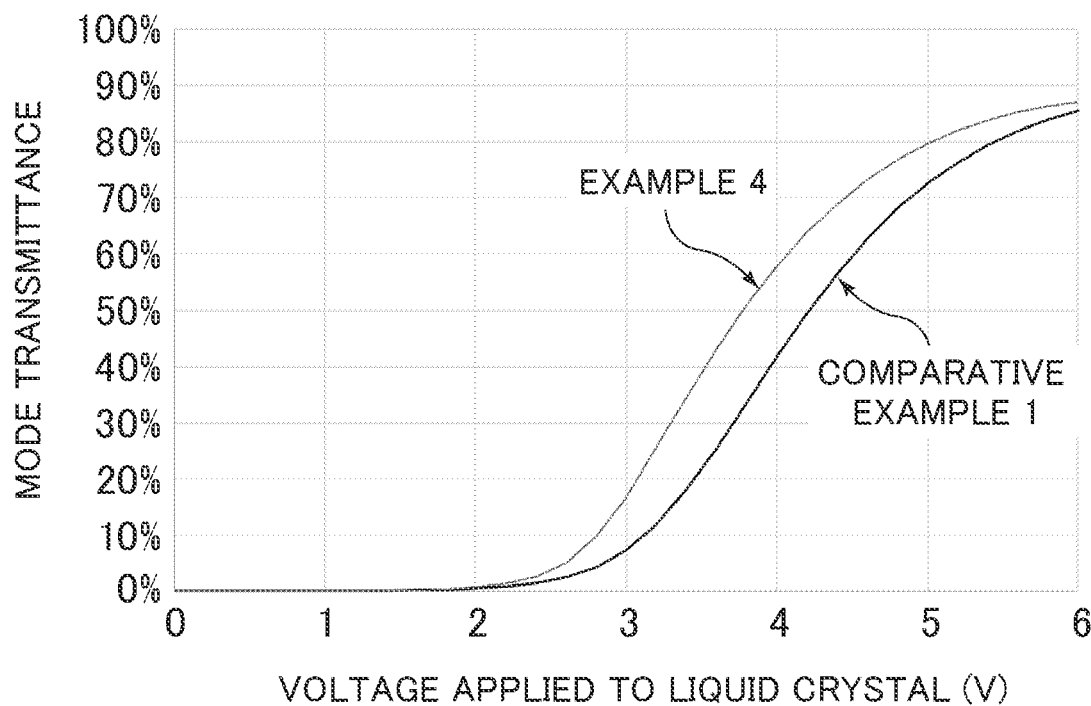
FIG. 34 is a simulation result of a liquid crystal display according to Example 4.
Figure 35:
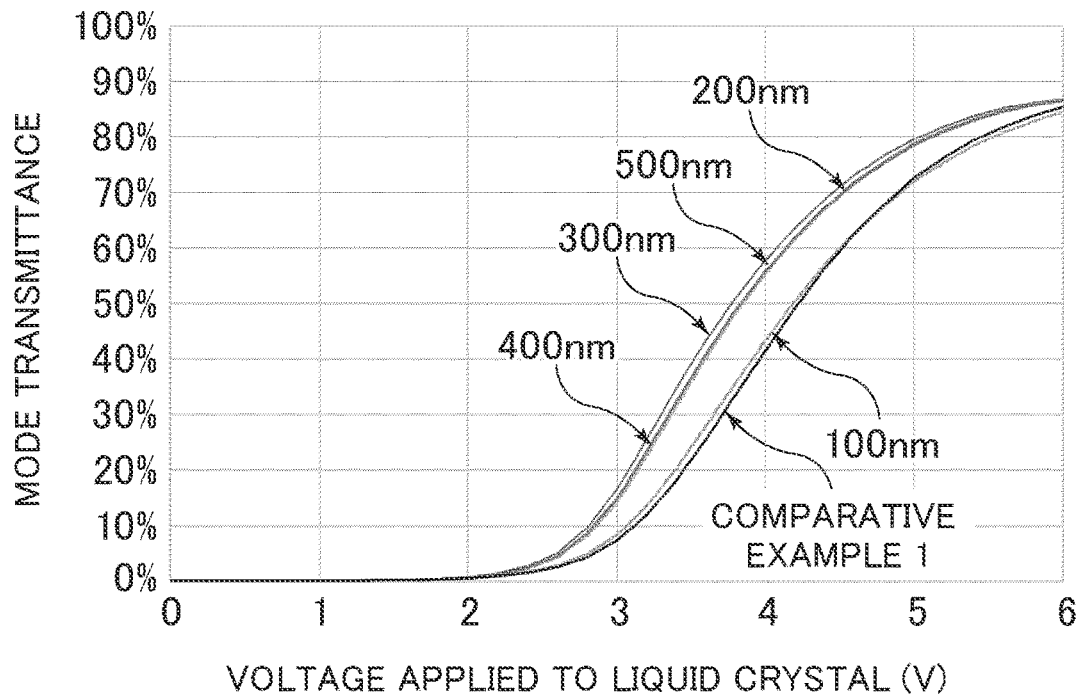
FIG. 35 is a simulation result of the liquid crystal display according to Example 4.
Figure 36:
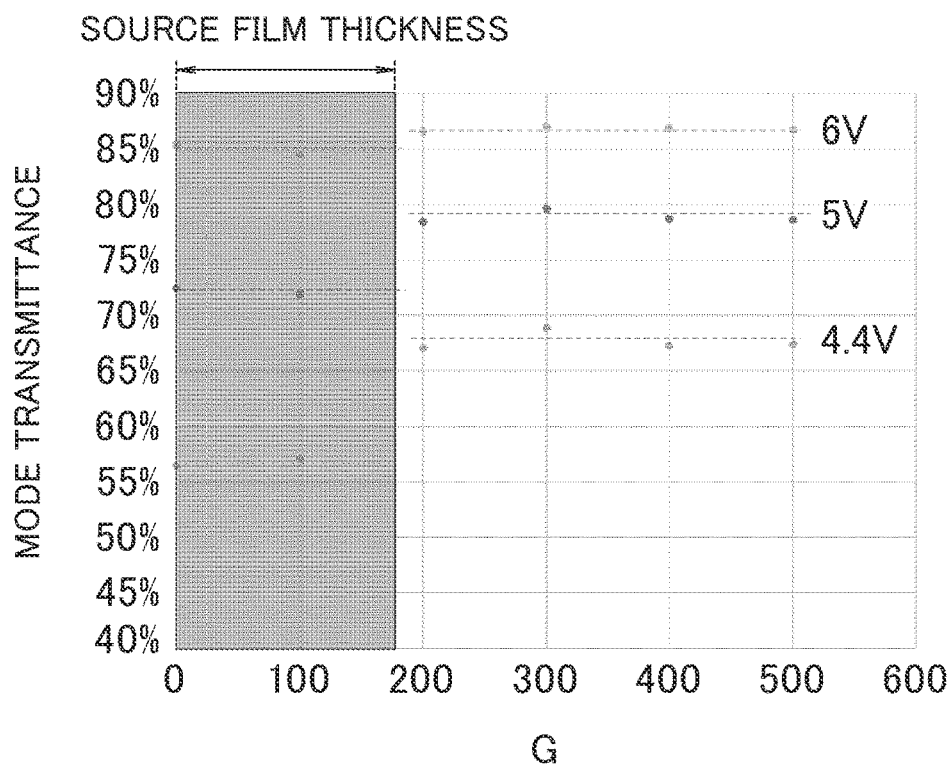
FIG. 36 is a simulation result of the liquid crystal display according to Example 4.

FIG. 34 is a graph illustrating the VT performance when G is 300 nm and the voltage applied to the liquid crystal is 0 to 6 V. FIG. 35 is a graph illustrating the VT performance when G is set to 100 nm, 200 nm, 300 nm, 400 nm, and 500 nm, respectively, and the voltage applied to the liquid crystal is set to 0 to 6 V, in order to examine the influence of G on the mode transmittance. FIG. 36 is a graph illustrating the relationship between the mode transmittance and G when the voltage applied to the liquid crystal is set to 4.4 V, 5 V, and 6 V, respectively. FIGS. 34 and 35 show simulation results of Comparative Example 1.

From FIG. 34, it can be seen that a lower voltage of about 0.3 V or more may be used in Example 4 as compared with Comparative Example 1 to obtain the same mode transmittance. Further, when the voltage applied to the liquid crystal is 5 V, it can be confirmed that the mode transmittance is improved by about 9% in Example 4 as compared with Comparative Example 1. Furthermore, from FIG. 35, it can be seen that lower voltage driving can be realized when G increases. This is remarkable particularly when G is 200 nm or more. That is, as illustrated in FIG. 36, when G exceeds the source film thickness (corresponding to the inside of the rectangle in FIG. 36), the electric field between the source wiring 120S (and the source electrode) and the pixel electrode 130 disappears, and thus it is considered that the transmittance is improved.

Here, when G is 200 nm or more, low voltage driving and the improved mode efficiency is maintained even when the film thickness and the relative dielectric constant ε of the PAS film and the relative dielectric constant ε of the gate insulating film (GI) are changed, and it was also found that these conditions were not particularly limited. Therefore, for example, there is no particular problem even when an organic insulating film is used as the gate insulating film (GI), or the PAS film is changed to SiO2, SiNO, TiO2, or the like. In the simulation, a liquid crystal molecule having a negative Δε was used, but it was also confirmed that a liquid crystal molecule having a positive Δε had the same effect.

Example 5

The liquid crystal display of the present example corresponds to the liquid crystal display of Embodiment 5 described above (refer to FIG. 3 and FIGS. 20 to 22). As an example of the liquid crystal display of the present example, the VT performance was simulated for an example in which the interlayer insulating film 140 is made of a PAS film (SiNx film) and the source film thickness (thickness of the source wiring 120S) is 175 nm, using liquid crystal molecules having Δε=−3.4 as liquid crystal molecules contained in the liquid crystal layer 300 (refer to FIGS. 37 to 41). Table 1 shows the mode transmittance and CR when the voltage applied to the liquid crystal=5 V, G=500 nm, J=0 nm, and α=0°.

Figure 37:
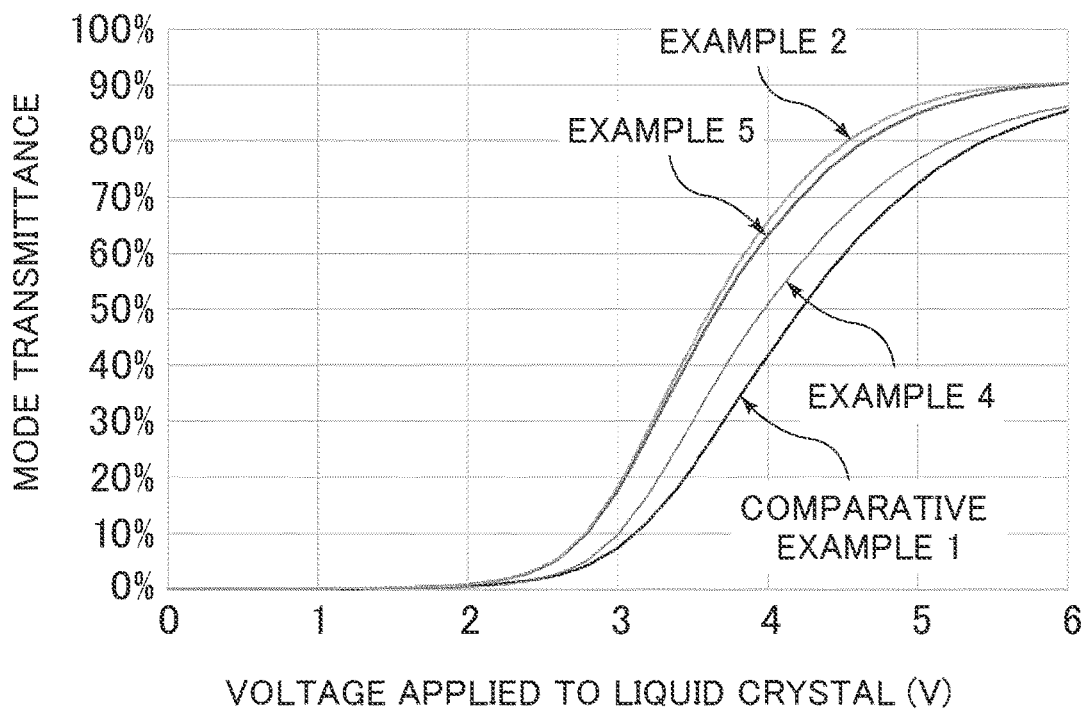
FIG. 37 is a simulation result of a liquid crystal display according to Example 5.
Figure 38:
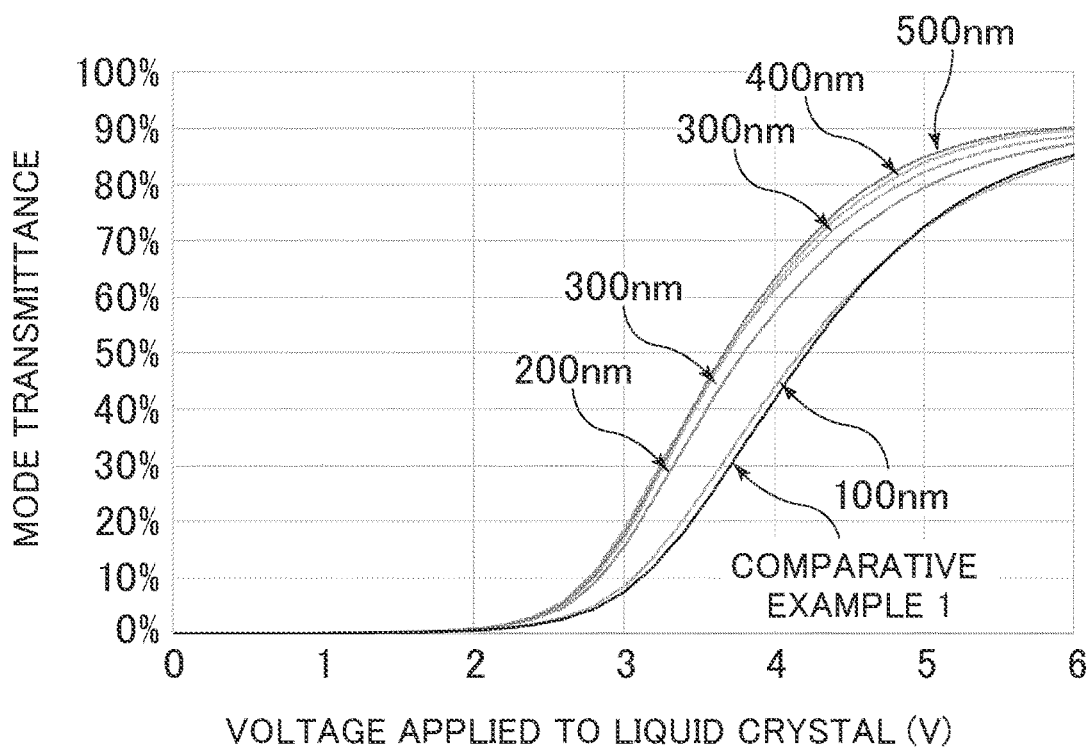
FIG. 38 is a simulation result of the liquid crystal display according to Example 5.
Figure 39:
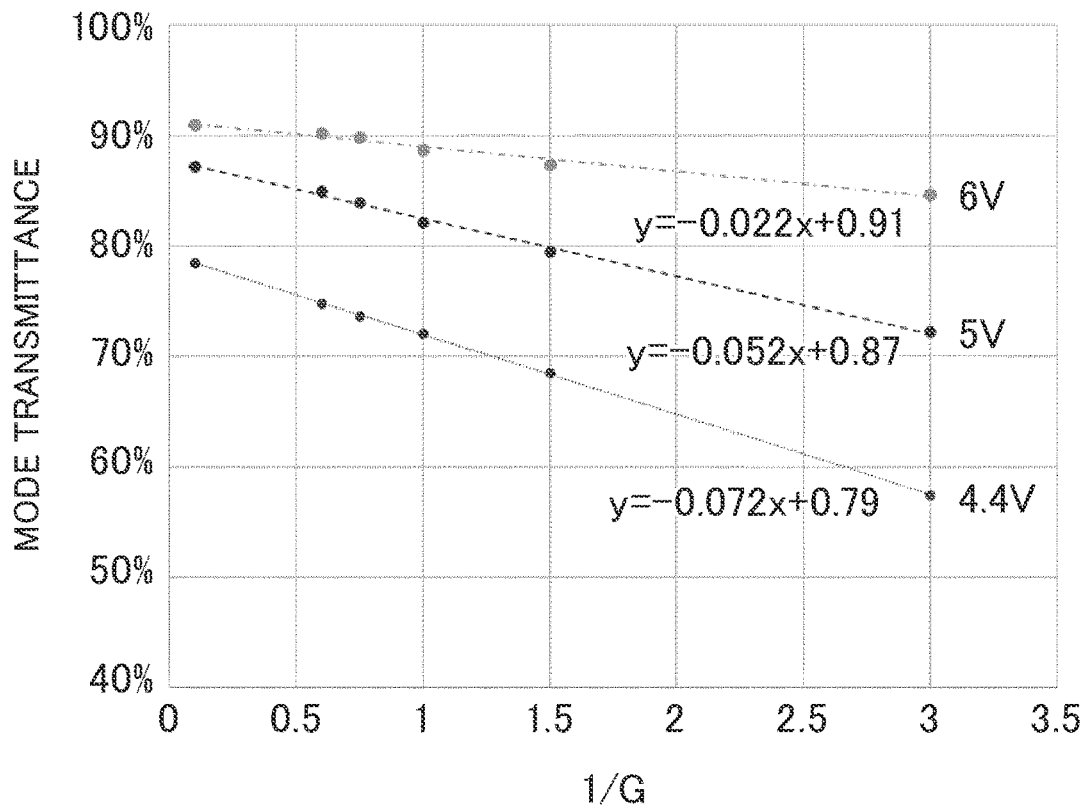
FIG. 39 is a simulation result of the liquid crystal display according to Example 5.

FIG. 37 is a graph illustrating the VT performance when G is 500 nm and the voltage applied to the liquid crystal is 0 to 6 V. FIG. 38 is a graph illustrating the VT performance when G is set to 100 nm, 200 nm, 300 nm, 400 nm, and 500 nm, respectively, and the voltage applied to the liquid crystal is set to 0 to 6 V, in order to examine the influence of G on the mode transmittance. FIG. 39 is a graph illustrating the relationship between the mode transmittance and (1/G') when the voltage applied to the liquid crystal is set to 4.4 V, 5 V, and 6 V, respectively. FIG. 37 shows the simulation results of Comparative Example 1 and a part of the examples, and FIG. 38 shows the simulation result of Comparative Example 1. In FIGS. 37 to 39, J=0 nm and α=5°.

Figure 40:
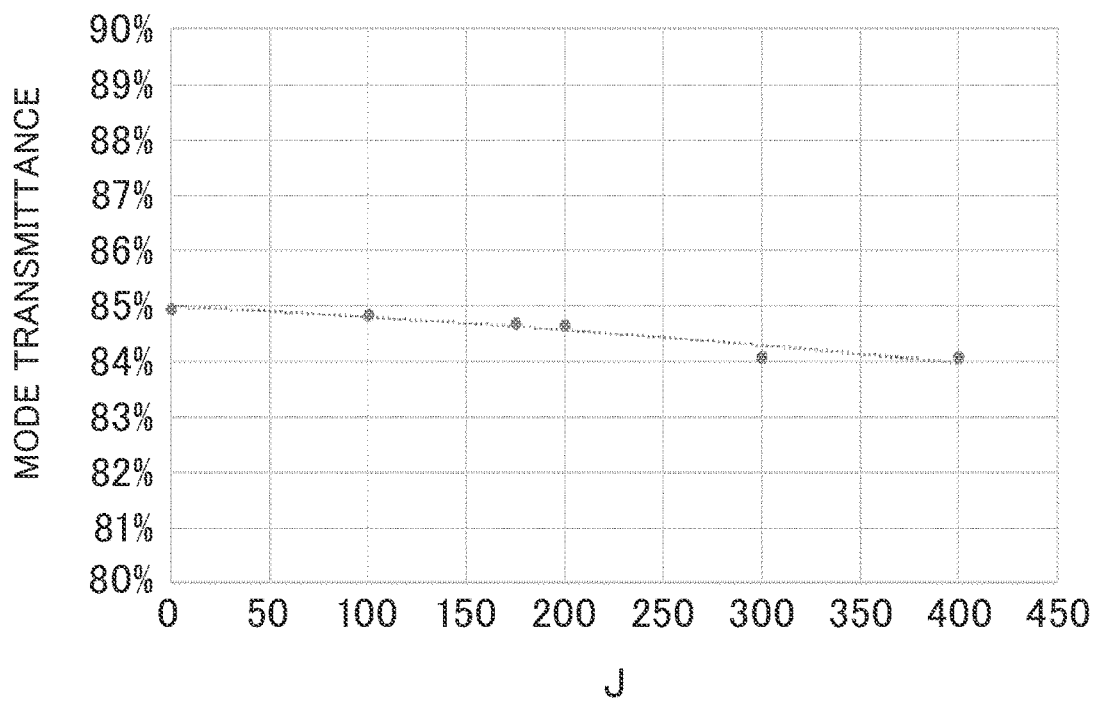
FIG. 40 is a simulation result of the liquid crystal display according to Example 5.
Figure 41:
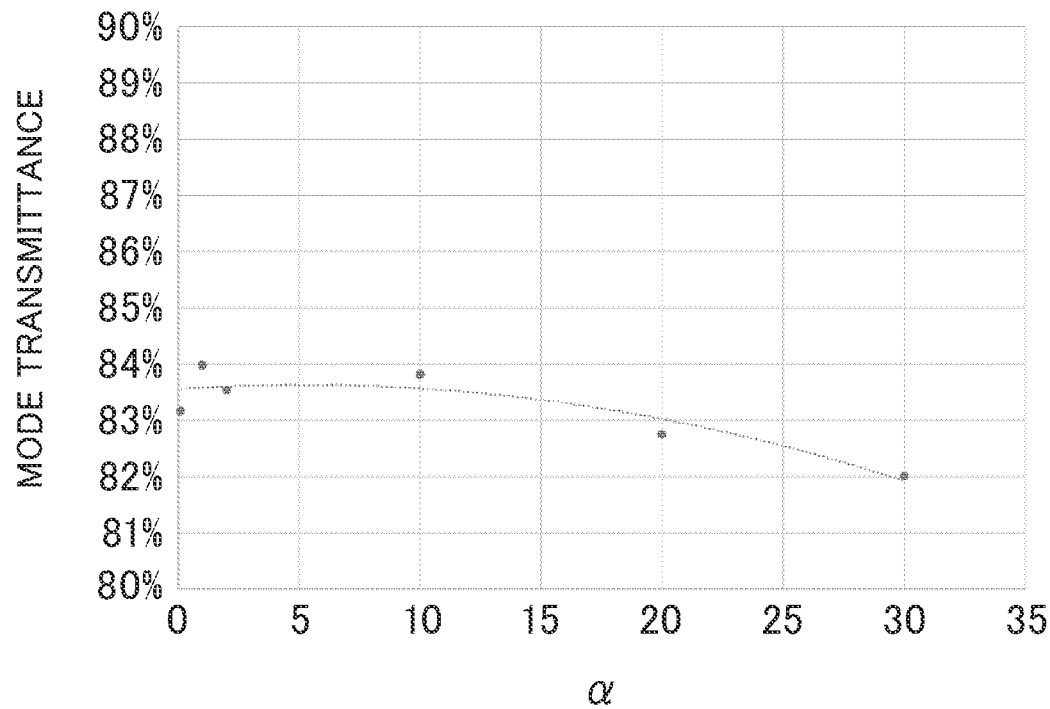
FIG. 41 is a simulation result of the liquid crystal display according to Example 5.

FIG. 40 is a graph illustrating the mode transmittance when G is set to 500 nm, J is set to 0 to 400 nm, and the voltage applied to the liquid crystal is set to 5 V, in order to examine the influence of J on the mode transmittance. FIG. 41 is a graph illustrating the mode transmittance when G=500 nm, J=0 nm, α=0 to 30°, and the voltage applied to the liquid crystal=5 V, in order to examine the influence of the taper angle α on the mode transmittance.

From FIG. 37, it can be seen that a lower voltage of about 0.2 V or more may be used in Example 5 as compared with Example 4 to obtain the same mode transmittance. Further, when the voltage applied to the liquid crystal=5 V, it can be confirmed that the mode transmittance is improved by about 4% in Example 5 as compared with Example 1. Further, from Table 1 below, in Example 5, although the transmittance is slightly lower than that in Example 2, it was found that the CR was improved by two times by flattening the flattening layer 160. From FIG. 38, it can be seen that lower voltage driving can be realized when the thickness difference G increases.

From FIG. 39, when examining the relationship between the mode transmittance y and G', it can be confirmed that there is a relationship expressed by the following Formula (3-1): y=(a3/G')+b3 (3-1) (in the formula, y represents mode transmittance (%). b3 represents the mode transmittance (%) when G' is infinite (∞)).

Specifically, when the voltage applied to the liquid crystal (voltage applied to the liquid crystal layer 300) is 5 V, it was found that the inclination a3=−0.052 and b3=0.87 (refer to FIG. 39). On the other hand, the coefficient and the like change for each voltage applied to the liquid crystal. In the case of the present example, it was also found that, when performing calculation in the voltage range (4.4 to 6 V) often used as a white voltage in the structure of the FFS/V3 mode, −0.072≤a3≤−0.022, and 0.79≤b3≤0.91 (refer to FIG. 39).

In the present example, even when the film thickness and the relative dielectric constant ε of the PAS film and the relative dielectric constant ε of the gate insulating film (GI) are changed, these are within the above Formulae (3-1) to (3-3), and thus it was also found that these conditions were not particularly limited. Therefore, for example, there is no particular problem even when an organic insulating film is used as the gate insulating film (GI), or the PAS film is changed to SiO2, SiNO, TiO2, or the like. In the simulation, a liquid crystal molecule having a negative Δε was used, but it was also confirmed that a liquid crystal molecule having a positive Δε had the same effect.

From FIG. 40, it can be seen that the mode transmittance is only different within 1% even when J is changed within the range of 0 to 400 nm. From FIG. 41, it can be seen that the mode transmittance is only different within 1% even when a is within the range of 0 to 20°. Therefore, it was found that J and a are not particularly limited as long as J and a are within these ranges. The mode transmittance is the highest when α=about 1° (refer to FIG. 41).

Reference Example 1

Figure 42:
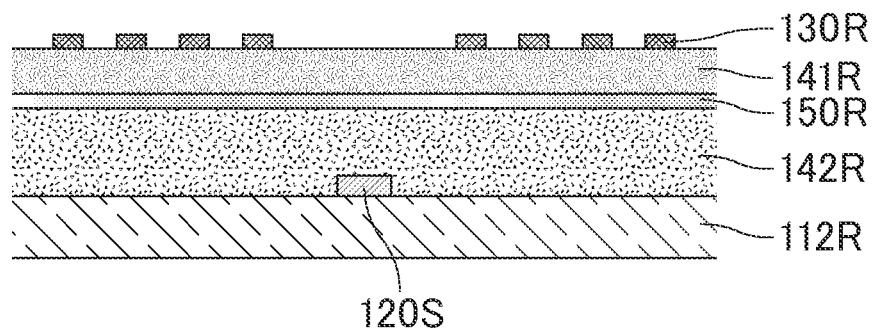
FIG. 42 is a schematic cross-sectional view illustrating a configuration of one substrate of a pair of substrates in an example of the liquid crystal display in the FFS/V2 mode of the related art.

The liquid crystal display of the present example corresponds to the liquid crystal display of the FFS/V2 mode of the related art (refer to FIG. 42). The liquid crystal display of the present example has the same configuration as the liquid crystal display of Example 1, except that the first substrate 100 has the configuration illustrated in FIG. 42. In FIG. 42, the insulating film 141R disposed between the common electrode 150R and the pixel electrode 130R is made of a PAS film (SiNx film), the insulating film 142R disposed between the common electrode 150R and the source wiring 120S is made of an organic insulating film, and the gate insulating film 112R is made of the same material as the gate insulating film 112 in Example 1. VT performance of the liquid crystal display was simulated (not illustrated). Table 1 shows the mode transmittance and CR when the voltage applied to the liquid crystal=5 V.

Comparative Example 1

Figure 43:
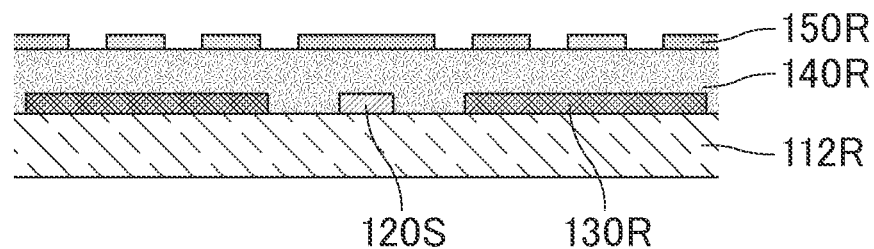
FIG. 43 is a schematic cross-sectional view illustrating a configuration of one substrate of the pair of substrates in an example of the liquid crystal display in the FFS/V3 mode of the related art.

The liquid crystal display of the present example corresponds to the liquid crystal display of the FFS/V3 mode of the related art (refer to FIG. 43). The liquid crystal display of the present example has the same configuration as the liquid crystal display of Example 1, except that the first substrate 100 has the configuration illustrated in FIG. 43. In FIG. 43, the insulating film 140R disposed between the pixel electrode 130R and the common electrode 150R is made of the same material as the interlayer insulating film 140 in Example 1. The VT performance of the liquid crystal display was simulated (refer to FIGS. 23, 24, 26, 27, 34, 35, 37, and 38). Table 1 shows the mode transmittance and CR when the voltage applied to the liquid crystal=5 V.

thickness difference G between the first region A1 where the pixel electrode 130 is disposed and the second region A2 where the pixel electrode 130 is not disposed is provided. In this case, as described above, an electric field generated between the source wiring 120S (and the source electrode) and the pixel electrode 130 is reduced, and a transverse electric field in the inter-pixel space is strengthened, and thus transmittance is improved. Example 5 is an example in which a transverse electric field in the inter-pixel space is further strengthened than Example 4. Example 5 is an example in which the step difference portion 110S is covered with the pixel electrode 130 as in Example 2. In Example 5, the transmittance is slightly lower than that in Example 2, but the CR is improved by two times.

Each aspect of the present disclosure described above may be appropriately combined without departing from the gist of the present disclosure.

The present disclosure contains subject matter related to that disclosed in Japanese Priority Patent Application JP 2023-012982 filed in the Japan Patent Office on Jan. 31, 2023, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

TABLE 1

|  | Reference Example 1 | Comparative Example 1 | Example 1 | Example 2 | Example 3 | Example 4 | Example 5 |
| --- | --- | --- | --- | --- | --- | --- | --- |
| G | — | — | 500 nm | 500 nm | 500 nm | 300 nm | 500 nm |
| α | — | — | — | 10° | 5° | — | 0° |
| Mode transmittance (5 V) | 80.0% | 76.2% | 83.4% | 86.6% (J = 0 nm) | 76.0% (Q = 500 nm) | 79.6% | 85.0% (J = 0 nm) |
| CR | 1300 | 1200 | 700 | 700 | 1250 | 1270 | 1400 |

The following items were confirmed from Table 1. In Comparative Example 1, while the electrode structure adopts a configuration (COM/Pix) of a common electrode and a pixel electrode in order from the observation surface side toward the rear surface side, in Examples 1 and 2, the relationship between the third common electrode 153 disposed in the inter-pixel space and the pixel electrode 130 adopts an electrode structure having a configuration (Pix/com) of a pixel electrode and a common electrode in order from the observation surface side. In Examples 1 and 2, it can be seen that a transverse electric field can be made to flow in the inter-pixel space, and thus high transmittance is exhibited. In addition, Example 3 is an example in which black luminance is improved by providing the flattening layer 160 after forming the common electrode 150 in Example 2 in order to improve contrast (CR). In Example 3, while the CR is significantly improved, the transverse electric field in the inter-pixel space is reduced, and thus the transmittance is lower than those in Examples 1 and 2. That is, it can be seen that there is a trade-off relationship between the transmittance and the CR.

Example 4 and Example 5 are examples devised in order to resolve this trade-off. Example 4 is an example in which the same (COM/Pix) configuration as in Comparative Example 1 is adopted as the electrode structure, but the

What is claimed is:

1. A liquid crystal display in a fringe field switching mode including a first pixel and a second pixel which are contiguous to each other, the liquid crystal display comprising, in order:
   a first substrate;
   a liquid crystal layer; and
   a second substrate, wherein
   the first substrate has at least one layer of a lower layer member, a first pixel electrode and a second pixel electrode which are disposed corresponding to each of the first pixel and the second pixel, an interlayer insulating film, and a common electrode provided with a plurality of parallel slits, in order toward a liquid crystal layer side,
   the at least one layer of the lower layer member has a first region and a second region having a smaller thickness than that of the first region, and via a step difference portion is located between the first region and the second region,
   the first pixel electrode and the second pixel electrode are disposed in the first region, and the second region is disposed between the first pixel electrode and the second pixel electrode,
   the common electrode includes a first common electrode and a second common electrode that overlap the first pixel electrode and the second pixel electrode, respectively, and further includes a third common electrode that overlaps the second region, and in a cross-sectional view, surfaces of the first pixel electrode and the second pixel electrode on the liquid crystal layer side have the same height as a surface of the third common electrode that is on the liquid crystal layer side, or the surfaces of the first pixel electrode and the second pixel electrode on the liquid crystal layer side protrude toward the liquid crystal layer side compared to the surface of the third common electrode, such that the height of the surfaces of the first and second pixel electrodes on the liquid crystal layer side is higher than the height of the surface of the third common electrode.

2. The liquid crystal display according to claim 1, wherein the at least one layer the lower layer member that has the first region and the second region comprises an insulating film.

3. The liquid crystal display according to claim 1, wherein the at least one layer of the lower layer member that has the first region and the second region comprises a gate insulating film.

4. The liquid crystal display according to claim 1, wherein the first substrate further has a source wiring disposed on the second region, and the source wiring extends in parallel with a longitudinal direction of the plurality of parallel slits.

5. The liquid crystal display according to claim 1, wherein the step difference portion is covered with the first pixel electrode and the second pixel electrode.

6. A liquid crystal display in a fringe field switching mode including a first pixel and a second pixel which are contiguous to each other, the liquid crystal display comprising, in order:

a first substrate a liquid crystal layer; and a second substrate, wherein the first substrate has at least one layer of a lower layer member, a first pixel electrode and a second pixel electrode which are disposed corresponding to each of the first pixel and the second pixel, an interlayer insulating film and a common electrode provided with a plurality of parallel slits, in order toward a liquid crystal layer side, the at least one layer of the lower layer member has a first region and a second region having a smaller thickness than that of the first region, and a step difference portion is located between the first region and the second region, the first pixel electrode and the second pixel electrode are disposed in the first region, and the second region is disposed between the first pixel electrode and the second pixel electrode, the common electrode includes a first common electrode and a second common electrode that overlap the first pixel electrode and the second pixel electrode, respectively, and further includes a third common electrode that overlaps the second region, and in a cross-sectional view, surfaces of the first pixel electrode and the second pixel electrode on the liquid crystal layer side are positioned on a first substrate side with respect to the surface of the third common electrode on the liquid crystal layer side.

7. The liquid crystal display according to claim 1, wherein the first substrate further has a flattening film on the liquid crystal layer side.

8. A liquid crystal display in a fringe field switching mode including a first pixel and a second pixel which are contiguous to each other, the liquid crystal display comprising, in order:

a first substrate;

a liquid crystal layer; and a second substrate, wherein the first substrate has at least one layer of a lower layer member, a first pixel electrode and a second pixel electrode which are disposed corresponding to each of the first pixel and the second pixel, an interlayer insulating film, and a common electrode provided with a plurality of parallel slits, in order toward a liquid crystal layer side, the at least one layer of the lower layer member has a first region and a second region having a smaller thickness than that of the first region, and a step difference portion is located between the first region and the second region, the first pixel electrode and the second pixel electrode are disposed in the first region, and the second region is disposed between the first pixel electrode and the second pixel electrode, and a difference G between the thickness of the first region and the thickness of the second region is equal to or more than 100 nm.

9. The liquid crystal display according to claim 1, wherein the step difference portion is provided perpendicularly to or obliquely to a bottom surface of the at least one layer of the lower layer member in the cross-sectional view.

10. The liquid crystal display according to claim 1, wherein the following Formulae (1-1), (1-2), and (1-3) are satisfied, $$y = (a1/G') + b1, \quad (1\text{-}1)$$

$$-0.070 \le a1 \le -0.018, \quad (1\text{-}2)$$

$$0.75 \le b1 \le 0.91, \quad (1\text{-}3)$$

in the formulae, y represents mode transmittance (%) when a voltage applied to the liquid crystal layer is 4.4 to 6 V, a1 represents a coefficient, G' is a value obtained by normalizing a difference G between the thickness of the first region and the thickness of the second region by G=300 nm, and b1 represents mode transmittance (%) when G' is infinite (∞).

11. The liquid crystal display according to claim 1, wherein the following Formulae (2-1), (2-2), and (2-3) are satisfied, $$y = (a2/G') + b2, \quad (2\text{-}1)$$

$$-0.073 \le a2 \le -0.018, \quad (2\text{-}2)$$

$$0.77 \le b2 \le 0.91, \quad (2\text{-}3)$$

in the formulae, y represents mode transmittance (%) when a voltage applied to the liquid crystal layer is 4.4 to 6 V, a2 represents a coefficient, G' is a value obtained by normalizing a difference G between the thickness of the first region and the thickness of the second region by G=300 nm, and b2 represents mode transmittance (%) when G' is infinite (∞).

12. The liquid crystal display according to claim 1, wherein the following Formulae (3-1), (3-2), and (3-3) are satisfied, $$y = (a3/G') + b3, \qquad (3\text{-}1)$$
$$-0.072 \le a3 \le -0.022, \qquad (3\text{-}2)$$
$$0.79 \le b3 \le 0.91, \qquad (3\text{-}3)$$

and
  in the formulae, y represents mode transmittance (%) when a voltage applied to the liquid crystal layer is 4.4 to 6 V, a3 represents a coefficient, G' is a value obtained by normalizing a difference G between the thickness of the first region and the thickness of the second region by G=300 nm, and b3 represents mode transmittance (%) when G' is infinite (∞).

13. The liquid crystal display according to claim 1, further comprising:
  a backlight.

14. The liquid crystal display according to claim 6, wherein
  the at least one layer of the lower layer member that has the first region and the second region comprises an insulating film.

15. The liquid crystal display according to claim 6, wherein
  the first substrate further has a source wiring disposed on the second region, and the source wiring extends in parallel with a longitudinal direction of the plurality of parallel slits.

16. The liquid crystal display according to claim 6, wherein
  the step difference portion is covered with the first pixel electrode and the second pixel electrode.

17. The liquid crystal display according to claim 8, wherein
  the at least one layer of the lower layer member that has the first region and the second region comprises an insulating film.

18. The liquid crystal display according to claim 8, wherein
  the first substrate further has a source wiring disposed on the second region, and
  the source wiring extends in parallel to a longitudinal direction of the plurality of parallel slits.

19. The liquid crystal display according to claim 10, wherein
  the step difference portion is covered with the first pixel electrode and the second pixel electrode.

* * * * *